US010437119B2

(12) United States Patent
Mori et al.

(10) Patent No.: US 10,437,119 B2
(45) Date of Patent: Oct. 8, 2019

(54) LIQUID CRYSTAL DISPLAY DEVICE

(71) Applicant: Panasonic Liquid Crystal Display Co., Ltd., Himeji-shi, Hyogo (JP)

(72) Inventors: Ikuko Mori, Hyogo (JP); Teruhisa Nakagawa, Hyogo (JP); Kazuhiko Tsuda, Hyogo (JP); Katsuji Tanaka, Hyogo (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 0 days.

(21) Appl. No.: 15/928,718

(22) Filed: Mar. 22, 2018

(65) Prior Publication Data
US 2018/0275438 A1     Sep. 27, 2018

(30) Foreign Application Priority Data
Mar. 23, 2017 (JP) ................. 2017-057034

(51) Int. Cl.
| G02F 1/133 | (2006.01) |
| G02F 1/1347 | (2006.01) |
| G02F 1/1368 | (2006.01) |
| G02F 1/1362 | (2006.01) |
| G02F 1/1335 | (2006.01) |
| G09G 3/36 | (2006.01) |

(52) U.S. Cl.
CPC .......... *G02F 1/1347* (2013.01); *G02F 1/1368* (2013.01); *G02F 1/13624* (2013.01); *G02F 1/133512* (2013.01); *G02F 1/133514* (2013.01); *G02F 1/136213* (2013.01); *G02F 1/136286* (2013.01); *G09G 3/3625* (2013.01); *G09G 3/3648* (2013.01); *G02F 1/13471* (2013.01); *G09G 2300/023* (2013.01); *G09G 2300/0426* (2013.01); *G09G 2300/0465* (2013.01); *G09G 2300/0478* (2013.01); *G09G 2330/10* (2013.01)

(58) Field of Classification Search
CPC .......... G02F 1/13306; G02F 1/136286; G02F 2001/134345; G09G 2300/023; G09G 3/3625
See application file for complete search history.

(56) References Cited

U.S. PATENT DOCUMENTS

| 2008/0284931 A1* | 11/2008 | Kimura ............... G02F 1/13624 349/39 |
| 2009/0147186 A1 | 6/2009 | Nakai et al. |
| 2010/0090928 A1* | 4/2010 | Maeda ............. G02F 1/133707 345/4 |
| 2011/0261268 A1 | 10/2011 | Nakai et al. |

(Continued)

FOREIGN PATENT DOCUMENTS

WO    2007/040127    4/2007

*Primary Examiner* — George R Fourson, III
(74) *Attorney, Agent, or Firm* — Hamre, Schumann, Mueller & Larson, P.C.

(57) ABSTRACT

A liquid crystal display device includes: a first display panel; and a second display panel opposing to the first display panel. Each of the first and second display panel includes a plurality of source lines, a plurality of gate lines, a plurality of thin film transistors, and a plurality of pixel electrodes electrically connected to corresponding one of the thin film transistors. In a second display panel, at least two thin film transistors are electrically connected to a same second source line and a same second gate line.

6 Claims, 18 Drawing Sheets

(56) References Cited

U.S. PATENT DOCUMENTS

| | | | |
|---|---|---|---|
| 2017/0154596 A1* | 6/2017 | Nishiyama | G02F 1/1345 |
| 2017/0330527 A1* | 11/2017 | Huang | G09G 3/3648 |
| 2017/0352332 A1* | 12/2017 | Nakao | G09G 5/39 |
| 2018/0081228 A1* | 3/2018 | Ono | G02F 1/133528 |
| 2018/0197495 A1* | 7/2018 | Xu | H01L 27/12 |
| 2018/0210247 A1* | 7/2018 | Ono | G02F 1/133707 |
| 2018/0233089 A1* | 8/2018 | Okamoto | G06F 3/0412 |

\* cited by examiner

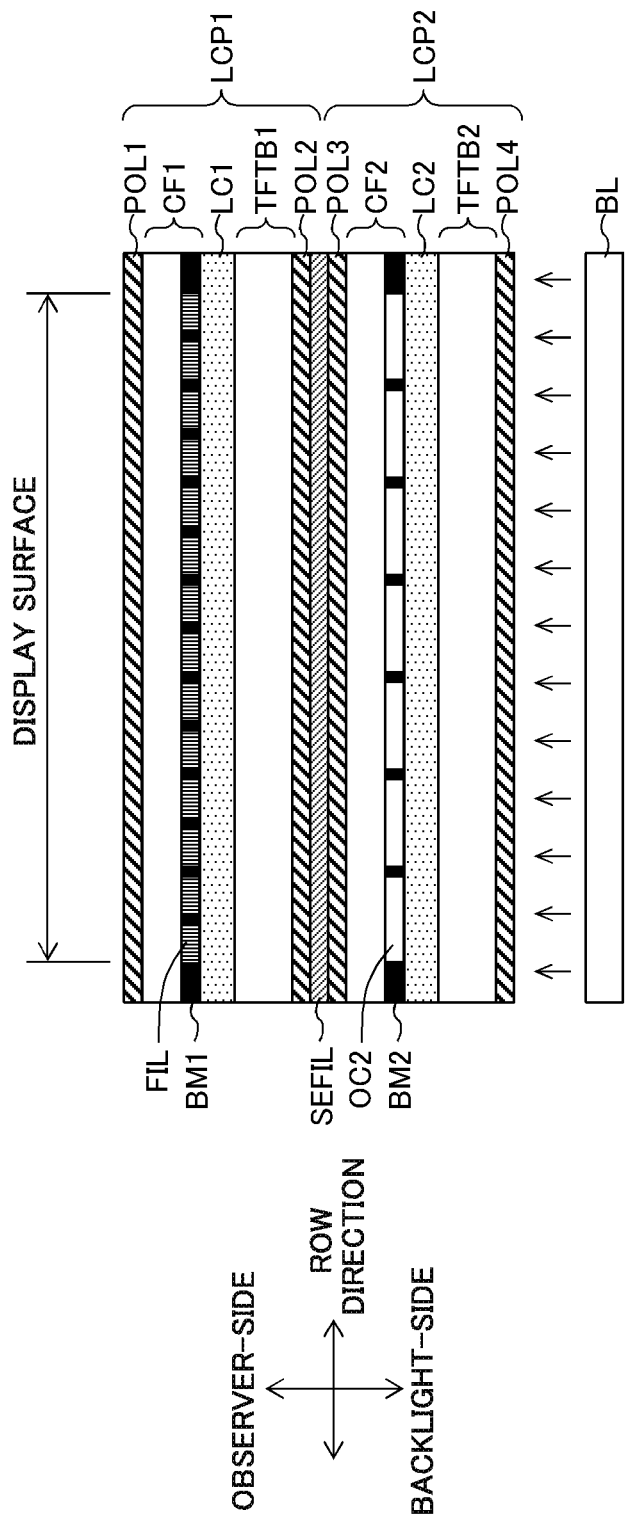

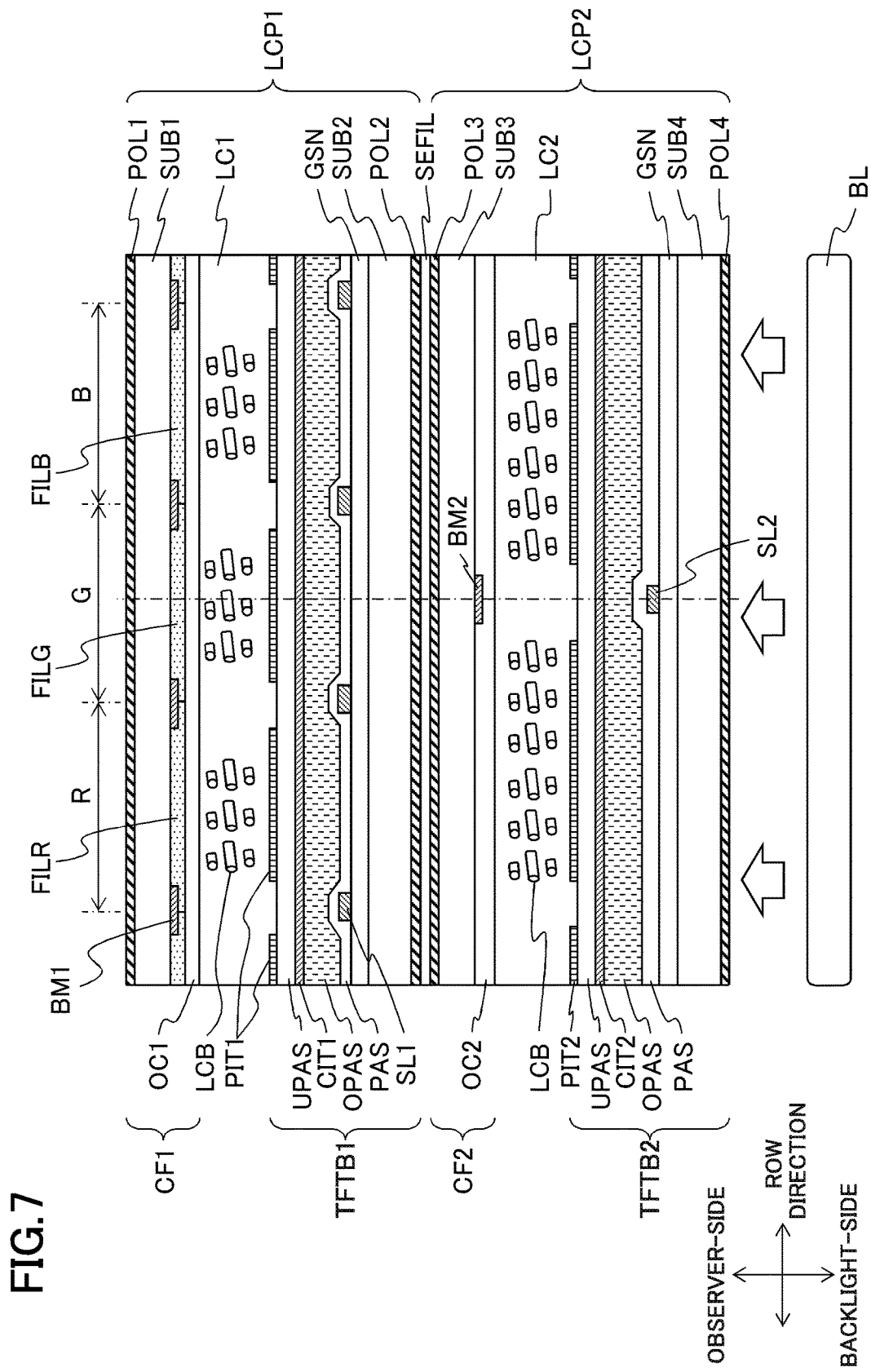

LIQUID CRYSTAL DISPLAY DEVICE

CROSS-REFERENCE TO RELATED APPLICATION

This application claims priority from Japanese application JP 2017-057034, filed Mar. 23, 2017. This Japanese application is incorporated herein by reference.

TECHNICAL FIELD

The present invention relates to a liquid crystal display device.

BACKGROUND

A technology, in which two display panels overlap each other and an image is displayed on each display panel based on an input video signal, is conventionally proposed to improve contrast of a liquid crystal display device (for example, see WO2007/040127). Specifically, for example, a color image is displayed on a front-side (observer-side) display panel in two display panels disposed back and forth, and a black-and-white image is displayed on a rear-side (backlight-side) display panel, thereby improving contrast. In the liquid crystal display device, to decrease the number of source drivers for a purpose of cost reduction, one pixel of a black-and-white image display panel overlaps with respect to three pixels (a red pixel, a green pixel, a blue pixel) of a color image display panel.

SUMMARY

For example in the case that one pixel of the black-and-white image display panel is defective, three pixels (a red pixel, a green pixel, a blue pixel) of the color image display panel, which overlap with said one pixel, can become distorted (ex. dark spot). The more number of pixels of the color image display panel that overlap with said one pixel of black-and-white image display panel, the worse the distortion of said pixels of the color image display panel. For example in the case that twenty-seven pixels of the color image display panel overlaps with one defective pixel of the black-and-white image display panel, the twenty-seven pixels of the color image display panel can become distorted.

The present disclosure is made in consideration of such a situation, and an object of the present disclosure is to improve an image degradation due to defective pixels in a liquid crystal display device in which the plurality of display panels overlap each other.

To solve the above problem, a liquid crystal display device according to a first disclosure comprises: a first display panel that includes a plurality of first source lines extending in a first direction and a plurality of first gate lines extending in a second direction different from the first direction; and a second display panel opposing the first display panel that includes a plurality of second source lines extending in the first direction and a plurality of second gate lines extending in the second direction. Each of the first display panel and the second display panel includes a plurality of thin film transistors, and a plurality of pixel electrodes of which each is electrically connected to a corresponding one of the plurality of thin film transistors. In the second display panel, at least two thin film transistors of the plurality of thin film transistors are electrically connected to a same second source line among the plurality of second source lines and a same second gate line among the plurality of second gate lines.

In the liquid crystal display device according to the first disclosure, the thin film transistors of the first display panel may include first thin film transistors, the pixel electrodes of the first display panel may include first pixel electrodes that are electrically connected to a corresponding one of the first thin film transistors, each of a plurality of first pixels may be defined by a driving area of a corresponding one of the plurality of first pixel electrodes in the first display panel, the thin film transistors of the second display panel may include second thin film transistors and third thin film transistors, the pixel electrodes of the second display panel may include second pixel electrodes that are electrically connected to a corresponding one of the second thin film transistors and third pixel electrodes that are electrically connected to a corresponding one of the third thin film transistors, each of a plurality of second pixels may be defined by a driving area of a corresponding one of the plurality of second pixel electrodes in the second display panel, each of a plurality of third pixels may be defined by a driving area of a corresponding one of the plurality of third pixel electrodes in the second display panel, the plurality of first pixels may include a plurality of first color pixels corresponding to a first color, a plurality of second color pixels corresponding to a second color different from the first color, and a plurality of third color pixels corresponding to a third color different from the first color and the second color, a first pixel group that includes one first color pixel of the plurality of first color pixels, one second color pixel of the plurality of second color pixels and one third color pixel of the plurality of third color pixels may overlap with a second pixel group that includes one second pixel of the plurality of second pixels and one third pixel of the plurality of third pixels in planar view, and one second thin film transistor of the plurality of second thin film transistors and one third thin film transistor of the plurality of the third thin film transistors may be electrically connected to a same second source line of the plurality of second source lines and a same second gate line of the plurality of second gate lines.

In the liquid crystal display device according to the first disclosure, each of the plurality of first color pixels, each of the plurality of second color pixels and each of the plurality of third color pixels may be arranged in the second direction, and each of the plurality of second pixels and each of the plurality of third pixels may be arranged in the first direction or the second direction.

In the liquid crystal display device according to the first disclosure, the thin film transistors of the second display panel may further include a plurality of fourth thin film transistors, a plurality of fifth thin film transistors, a plurality of fourth pixel electrodes of which each is electrically connected to a corresponding one of the fourth thin film transistors, and a plurality of fifth pixel electrodes of which each is electrically connected to a corresponding one of the fifth thin film transistors. Each of a plurality of fourth pixels may be defined by a driving area of a corresponding one of the plurality of fourth pixel electrodes in the second display panel. Each of a plurality of fifth pixels may be defined by a driving area of a corresponding one of the plurality of fifth pixel electrodes in the second display panel. The second pixel group may include one of the plurality of fourth pixels and one of the plurality of fifth pixels in addition to one of the plurality of second pixels and one of the plurality of third pixels, and one second pixel electrode of the plurality of second pixel electrodes, one third pixel electrode of the plurality of third pixel electrodes, one fourth pixel electrode of the plurality of fourth pixel electrodes and one fifth pixel electrode of the plurality of fifth pixel electrodes may be electrically connected to a same second gate line and a same second source line.

In the liquid crystal display device according to the first disclosure, the thin film transistors of the first display panel may include a plurality of first thin film transistors, the pixel electrodes of the first display panel may include first pixel electrodes that are electrically connected to a corresponding one of the first thin film transistors. Each of a plurality of first pixels may be defined by a driving area of a corresponding one of the plurality of first pixel electrodes in the first display panel. The thin film transistors of the second display panel may include a plurality of second thin film transistors and a plurality of third thin film transistors. Each of the plurality of second pixel electrodes may be electrically connected to a corresponding one of the plurality of second thin film transistors and a corresponding one of the plurality of third thin film transistors. Each of a plurality of second pixels may be defined by a driving area of a corresponding one of plurality of second pixel electrodes in the second display panel. One second thin film transistor of the plurality of second thin film transistors and one third thin film transistor of the plurality of third thin film transistors may be electrically connected to a same second source line and a same second gate line.

In the liquid crystal display device according to the first disclosure, the plurality of first pixels may include a plurality of first color pixels corresponding to a first color, a plurality of second color pixels corresponding to a second color different from the first color, and a plurality of third color pixels corresponding to a third color different from the first color and the second color, and a first pixel group that includes one first color pixel of the plurality of first color pixels, one second color pixel of the plurality of second color pixels and one third color pixel of the plurality of third color pixels may overlap with the second pixel in planar view.

To solve the above problem, a liquid crystal display device according to a second disclosure comprises: a first display panel; and a second display panel opposing to the first display panel. The first display panel includes a plurality of first source lines extending in a first direction, a plurality of first gate lines extending in a second direction different from the first direction, a plurality of first thin film transistors of which each is electrically connected to a corresponding one of the plurality of first source lines and a corresponding one of the plurality of first gate lines, and a plurality of first pixel electrodes of which each is electrically connected to a corresponding one of the plurality of first thin film transistors. Each of a plurality of first pixels are defined by a driving area of a corresponding one of the plurality of first pixel electrodes in the first display panel. The second display panel includes a plurality of second source lines extending in the first direction, a plurality of second gate lines extending in the second direction, a plurality of second thin film transistors, and a plurality of second pixel electrodes of which each is electrically connected to a corresponding one of the second thin film transistors. Each of a plurality of second pixels are defined by a driving area of a corresponding one of the plurality of second pixel electrodes in the second display panel. Each of the plurality of the second thin film transistors includes a first conductive electrode electrically connected to a corresponding one of the plurality of source lines, a second conductive electrode including a first branch electrode and a second branch electrode, and a control electrode electrically connected to a corresponding one of the plurality of gate lines, and the first branch electrode and the second branch electrode are electrically connected to a same second pixel electrode.

BRIEF DESCRIPTION OF THE DRAWINGS

FIG. 5 is a sectional view taken along line A-A' in FIGS. 3 and 4;

FIG. 7 is a sectional view taken along line B-B' in FIGS. 6A and 6B;

DETAILED DESCRIPTION

Hereinafter, exemplary embodiments of the present disclosure will be described with reference to the drawings. A liquid crystal display device of each exemplary embodiment described below includes a plurality of display panels that display images, a plurality of driving circuits (a plurality of source drivers and a plurality of gate drivers) that drive the display panels, a plurality of timing controllers that control the driving circuits, an image processor that performs image processing on an input video signal input from an outside and outputs image data to each of the timing controllers, and a backlight that irradiates the plurality of display panels with light from a rear surface side. There is no limitation to the number of display panels, but it is only necessary to provide at least two display panels. When viewed from the observer side, the plurality of display panels are disposed while overlapping each other in a front-back direction. An image is displayed on each of the display panels. Liquid crystal display device LCD including two display panels will be described below by way of example.

First Exemplary Embodiment

Figure 1:
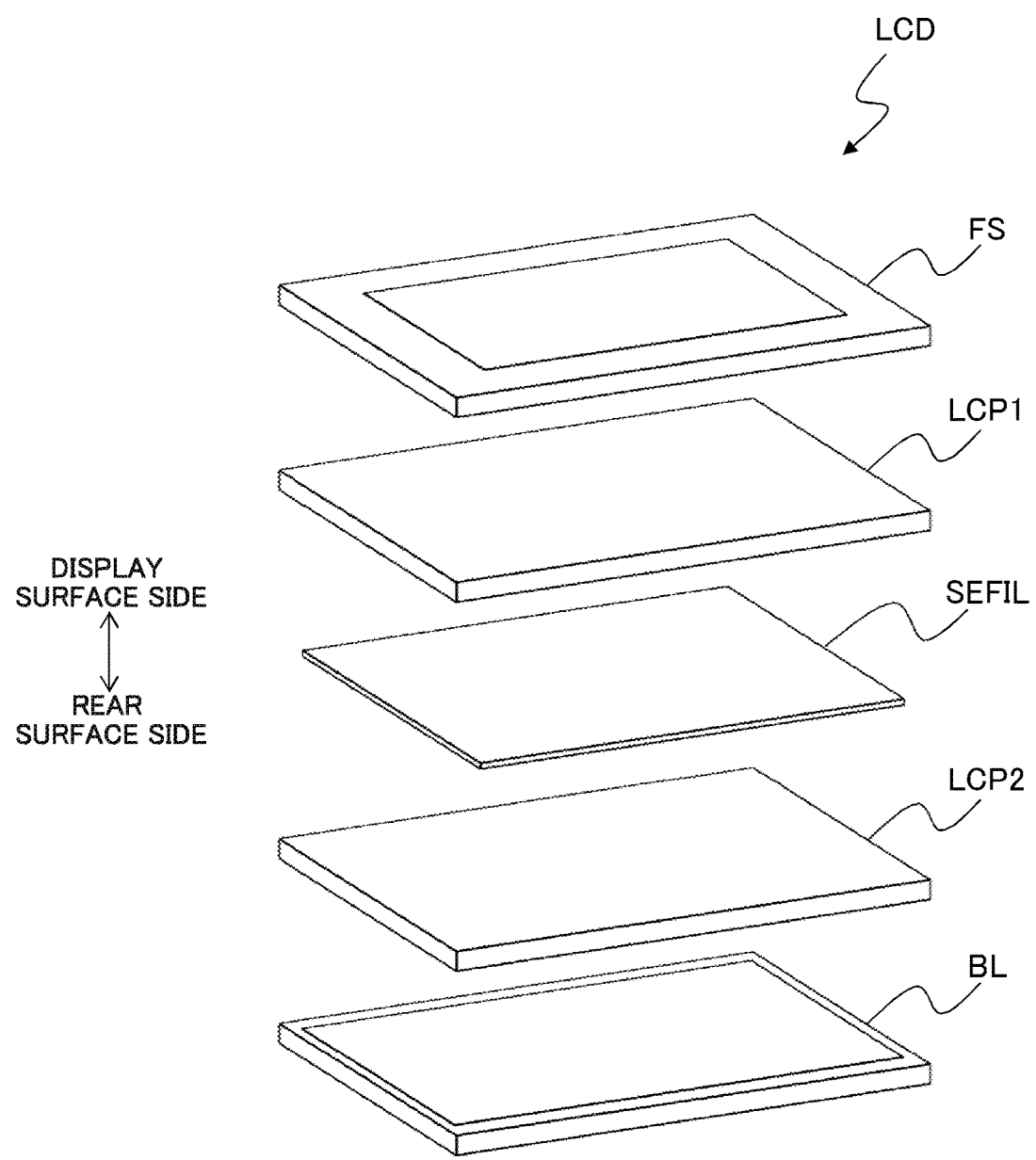
FIG. 1 is a perspective view illustrating a schematic configuration of a liquid crystal display device according to a first exemplary embodiment.

FIG. 1 is a perspective view illustrating a schematic configuration of a liquid crystal display device LCD of a first exemplary embodiment. As illustrated in FIG. 1, the liquid crystal display device LCD includes a first display panel LCP1 which is disposed at a position (front side) closer to an observer, a second display panel LCP2 which is disposed at a position (rear side) farther away from the observer than the first display panel LCP1 is, an adhesive layer SEFIL in which the first display panel LCP1 and the second display panel LCP2 adhere to each other, a backlight BL disposed on the rear surface side of the second display panel LCP2, and a front chassis FS that covers the first display panel LCP1 and the second display panel LCP2 from the display surface side. The second display panel LCP2 may be disposed on the front side while the first display panel LCP1 may be disposed on the rear side.

Figure 2:
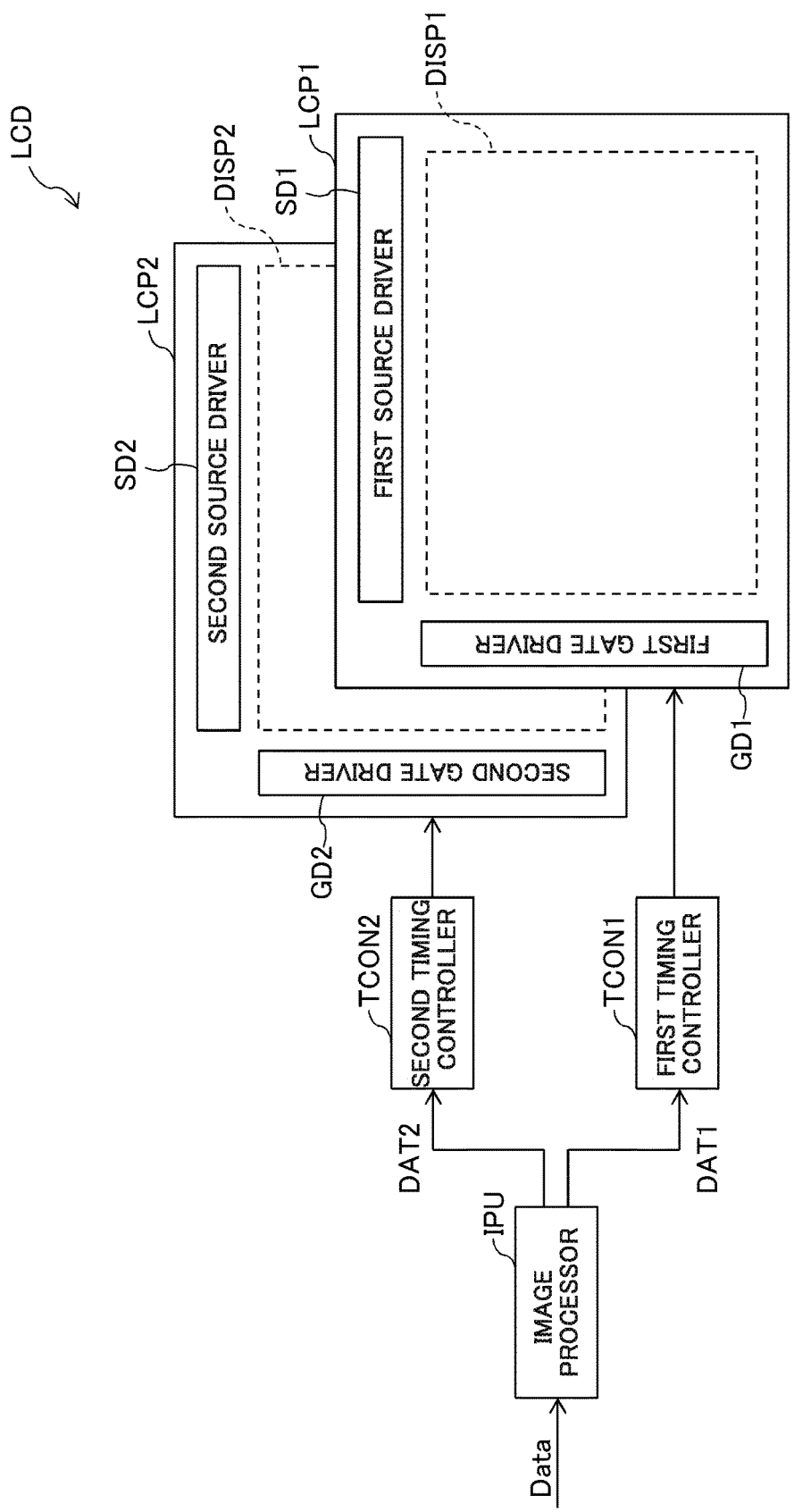
FIG. 2 is a plan view illustrating the schematic configuration of the liquid crystal display device according to the first exemplary embodiment.
Figure 3:
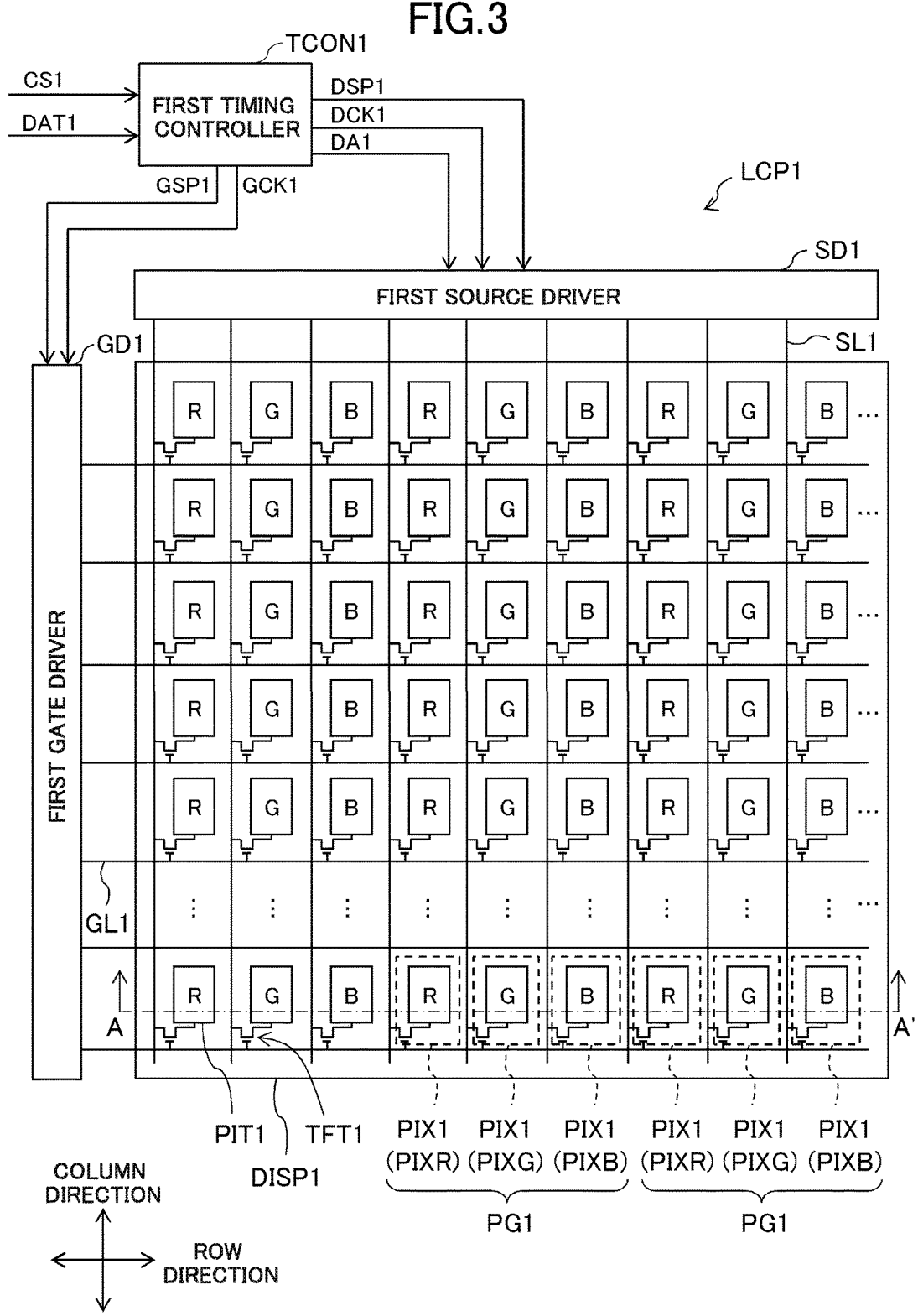
FIG. 3 is a plan view illustrating a schematic configuration of a first display panel according to the first exemplary embodiment.
Figure 4:
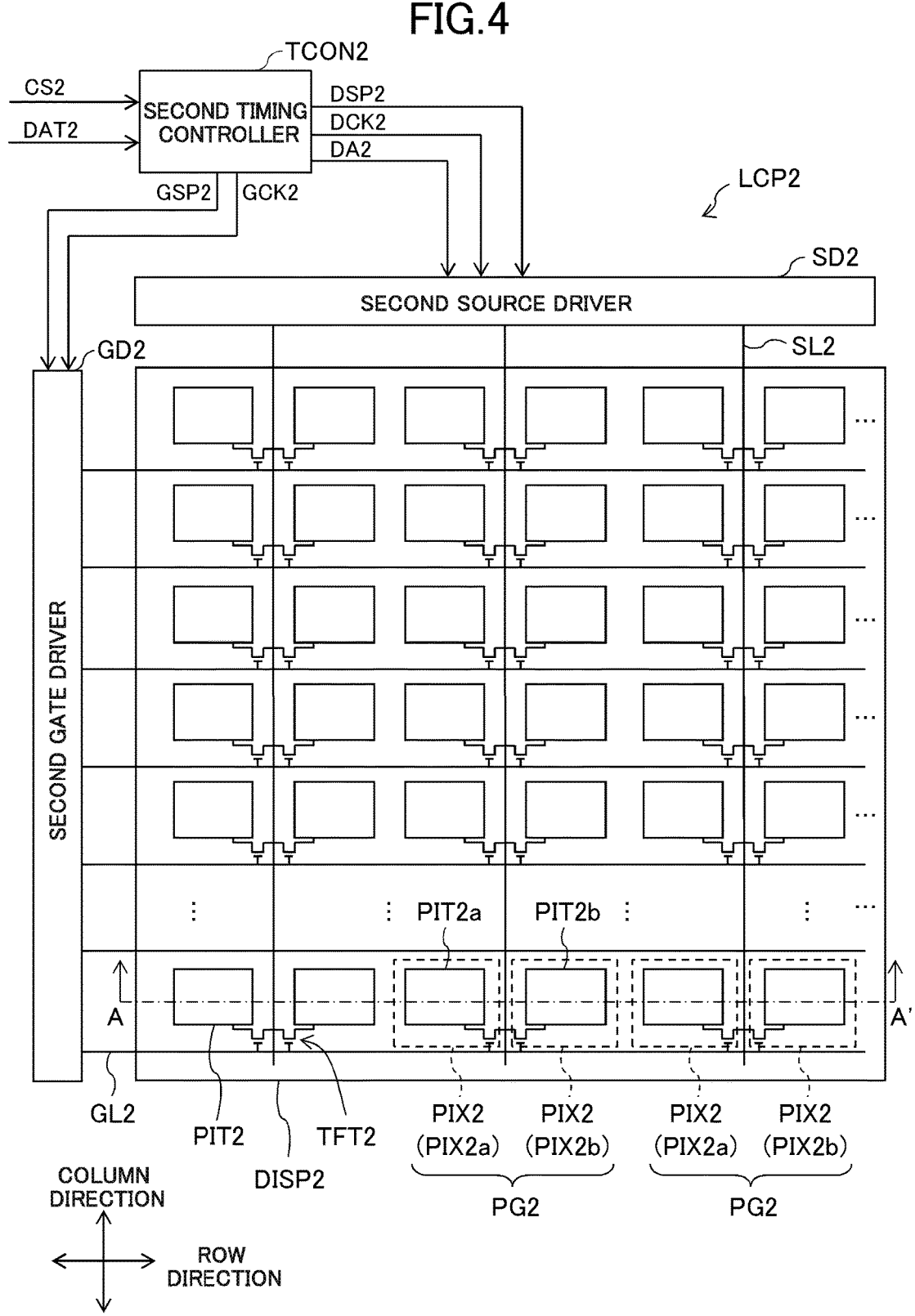
FIG. 4 is a plan view illustrating a schematic configuration of a second display panel according to the first exemplary embodiment.

FIG. 2 is a view illustrating the schematic configuration of the liquid crystal display device LCD of the first exemplary embodiment. As illustrated in FIG. 2, the first display panel LCP1 includes a first source driver SD1 and a first gate driver GD1, and the second display panel LCP2 includes a second source driver SD2 and a second gate driver GD2. In addition, the liquid crystal display device LCD includes a first timing controller TCON1 that controls the first source driver SD1 and the first gate driver GD1, a second timing controller TCON2 that controls the second source driver SD2 and the second gate driver GD2, and an image processor IPU that outputs image data to the first timing controller TCON1 and the second timing controller TCON2. For example, the first display panel LCP1 displays a color image in a first image display region DISP1 according to the input video signal, and the second display panel LCP2 displays a black-and-white (monochrome) image in a second image display region DISP2 according to the input video signal. The image processor IPU receives input video signal Data transmitted from an external system (not illustrated), performs known image processing on input video signal Data, outputs first image data DAT1 to the first timing controller TCON1, and outputs second image data DAT2 to the second timing controller TCON2. The image processor IPU also outputs a control signal CS1, CS2 (see, FIGS. 3 and 4) such as a synchronizing signal to the first timing controller TCON1 and the second timing controller TCON2. For example, the first image data DAT1 is image data for displaying the color image, and the second image data DAT2 is image data for displaying the black-and-white image. FIG. 3 is a plan view illustrating a schematic configuration of the first display panel LCP1 according to the first exemplary embodiment, and FIG. 4 is a plan view illustrating a schematic configuration of the second display panel LCP2 according to the first exemplary embodiment. FIG. 5 is a sectional view taken along line A-A' in FIGS. 3 and 4.

The schematic configuration of first display panel LCP1 will be described with reference to FIGS. 3 and 5. As illustrated in FIG. 5, the first display panel LCP1 includes a thin film transistor substrate TFTB1 disposed on the side of the backlight BL, an opposing substrate CF1 which is disposed on the observer side while being opposite to the thin film transistor substrate TFTB1, and a liquid crystal layer LC1 disposed between the thin film transistor substrate TFTB1 and the opposing substrate CF1. A polarizing plate POL2 is disposed on the side of the first display panel LCP1 near the backlight BL, and a polarizing plate POL1 is disposed on the observer side of the first display panel LCP1.

In the thin film transistor substrate TFTB1, as illustrated in FIG. 3, a plurality of first source lines SL1 extending in a first direction (for example, a column direction), and a plurality of first gate lines GL1 extending in a second direction (for example, a row direction) different from the first direction are formed, and a plurality of first thin film transistors TFT1 are formed close to an intersection between a corresponding one of the plurality of the first source lines SL1 and a corresponding one of the plurality of the first gate lines GL1. In the first display panel LCP1, a driving area (dot image area) of a first pixel electrode PIT1 electrically connected to the thin film transistor TFT1 is defined as one first pixel PIX1, and a plurality of pixels PIX1 are disposed in a matrix form (the row direction and the column direction). The plurality of the first source lines SL1 are disposed at equal intervals in the row direction, and the plurality of the first gate lines GL1 are disposed at equal intervals in the column direction. In the thin film transistor substrate TFTB1, each first pixel electrode PIT1 is formed in a corresponding one of the pixels PIX1, and one common electrode (not illustrated in FIGS.) common to the plurality of the pixels PIX1 is formed. The thin film transistor TFT1 includes a drain electrode electrically connected to the source line SL1, a source electrode electrically connected to the first pixel electrode PIT1, and a gate electrode electrically connected to the gate line GL1.

As illustrated in FIG. 5, a plurality of color filter layers FIL (colored portions) are formed on the opposing substrate CF1 according to each first pixel PIX1. Each color filter layer FIL is surrounded by black matrix BM1 blocking light transmission. For example, each color filter layer FIL is formed into a rectangular shape. The plurality of the color filter layers FIL include red color filter layers (red portion) made of a red (R color) material to transmit red light, green color filter layers (green portion) made of a green (G color) material to transmit green light, and blue color filter layers (blue portion) made of a blue (B color) material to transmit blue light. The red color filter layers, green color filter layers, and blue color filter layers are repeatedly arrayed in the row direction in this order, identical-color filter layers are arrayed in the column direction, and the black matrix BM is formed at a boundary between color filter layers adjacent to each other in the row direction and the column direction. In accordance with the color filter layers, as illustrated in FIG. 3, the plurality of the pixels PIX1 include red pixels PIXR corresponding to the red color filter layers, green pixels PIXG corresponding to the green color filter layers, and blue pixels PIXB corresponding to the blue color filter layers. In the first display panel LCP1, the red pixels PIXR, the green pixels PIXG, and the blue pixels PIXB are repeatedly arrayed in the row direction in this order, and pixels PIX1 having the identical color are arrayed in the column direction.

As illustrated in FIG. 3, based on the first image data DAT1 and first control signals CS1 (such as a clock signal, a vertical synchronizing signal, and a horizontal synchronizing signal), which are output from the image processor IPU, the first timing controller TCON1 generates various timing signals (data start pulse DSP1, data clock DCK1, gate start pulse GSP1, and gate clock GCK1) to control first image data DA1 and drive of a first source driver SD1 and a first gate driver GD1 (see FIG. 3). The first timing controller TCON1 outputs the first image data DA1, a data start pulse DSP1, and a data clock DCK1 to the first source driver SD1, and outputs a gate start pulse GSP1 and a gate clock GCK1 to the first gate driver GD1.

The first source driver SD1 outputs a data signal (data voltage, i.e. gradation voltage) corresponding to the first image data DA1 to the source line SL1 based on the data start pulse DSP1 and the data clock DCK1. The first gate driver GD1 outputs a gate signal (gate voltage) to the first gate lines GL1 based on the gate start pulse GSP1 and the gate clock GCK1.

The first source driver SD1 supplies the data voltage to the first source lines SL1, and the first gate driver GD1 supplies the gate voltage to the first gate lines GL1. Common voltage Vcom is supplied from a common driver (not illustrated) to the common electrode. When the gate voltage (gate-on voltage) is supplied to a gate line GL1, a thin film transistor TFT1 connected to the gate line GL1 is turned on, and the data voltage is supplied to a first pixel electrode PIT1 through a source line SL1 connected to said thin film transistor TFT1. An electric field is generated by a difference between the data voltage supplied to the first pixel electrode PIT1 and the common voltage Vcom supplied to the common electrode. A liquid crystal is driven by the electric field, and transmittance of the light emitted from the backlight BL is controlled, thereby displaying an image. In the first display panel LCP1, a color image is displayed by the supply of a desired data voltage to the source lines SL1 connected to the first pixel electrodes PIT1 included in either red pixel PIXR, green pixel PIXG, or blue pixel PIXB.

The schematic configuration of the second display panel LCP2 will be described with reference to FIGS. 4 and 5. As illustrated in FIG. 5, the second display panel LCP2 includes a thin film transistor substrate TFTB2 disposed on the backlight side, an opposing substrate CF2, which is disposed on the observer side while being opposite to the thin film transistor substrate TFTB2, and a liquid crystal layer LC2 disposed between the thin film transistor substrate TFTB2 and the opposing substrate CF2. A polarizing plate POL4 is disposed on the backlight side of the second display panel LCP2, and a polarizing plate POL3 is disposed on the observer side of the second display panel LCP2. An adhesive layer SEFIL is disposed between the polarizing plate POL2 of the first display panel LCP1 and the polarizing plate POL3 of the second display panel LCP2.

In the thin film transistor substrate TFTB2, as illustrated in FIG. 4, a plurality of second source lines SL2 extending in the column direction, and a plurality of second gate lines GL2 extending in the row direction are formed, and a plurality of thin film transistors TFT2 is formed close to the intersection between a corresponding one of the plurality of the second source lines SL2 and a corresponding one of the plurality of the second gate lines GL2. In the second display panel LCP2, a driving area (dot image area) of a pixel electrode PIT2 electrically connected to the thin film transistor TFT2 is defined as one pixel PIX2. In this exemplary embodiment, two pixels PIX2 (PIX2a, PIX2b) adjacent in the row direction are provided in a region surrounded by two second source lines SL2 adjacent to each other and two second gate lines GL2 adjacent to each other in planar view. A plurality of pixels PIX2 are disposed in a matrix form (the row direction and the column direction). The plurality of the second source lines SL2 are disposed at equal intervals in the row direction, and the plurality of the second gate lines GL2 are disposed at equal intervals in the column direction. In the thin film transistor substrate TFTB2, each pixel electrode PIT2 is formed in a corresponding one of the pixels PIX2, and one common electrode (not illustrated in FIGS.) common to the plurality of the pixels PIX2 is formed. Two thin film transistors TFT2 adjacent in the row direction through the source line SL2 are connected to a same gate line GL2 and a same source line SL2. In other words, two thin film transistors TFT2 disposed on either side of one source line SL2 are connected to that source line SL2 and to the same gate line GL2. The thin film transistor TFT2 includes a drain electrode electrically connected to the source line SL2, a source electrode electrically connected to the pixel electrode PIT2, and a gate electrode electrically connected to the gate line GL2. Drain electrodes of the two thin film transistors TFT2 adjacent in the row direction through the source line SL2 are connected to each other and to the source line SL2.

As illustrated in FIG. 5, in opposing substrate CF2, black matrix BM2 is formed at a position corresponding to a boundary of each pixel PIX2. The color filter layer (colored portion) is not formed in a region surrounded by black matrix BM2. For example, overcoat film OC is formed in the region.

As shown in FIG. 4, based on second image data DAT2 and second control signals CS2 (such as a clock signal, a vertical synchronizing signal, and a horizontal synchronizing signal), which are output from the image processor IPU, the second timing controller TCON2 generates various timing signals (data start pulse DSP2, data clock DCK2, gate start pulse GSP2, and gate clock GCK2) to control second image data DA2 and drive of the second source driver SD2 and the second gate driver GD2. The second timing controller TCON2 outputs second image data DA2, a data start pulse DSP2, and a data clock DCK2 to the second source driver SD2, and outputs a gate start pulse GSP2 and a gate clock GCK2 to the second gate driver GD2.

The second source driver SD2 outputs the data voltage corresponding to second image data DA2 to the second source lines SL2 based on the data start pulse DSP2 and the data clock DCK2. The second gate driver GD2 outputs the gate voltage to the second gate lines GL2 based on the gate start pulse GSP2 and the gate clock GCK2.

The second source driver SD2 supplies the data voltage to the second source lines SL2, and the second gate driver GD2 supplies the gate voltage to the second gate lines GL2. Common voltage Vcom is supplied from a common driver (not illustrated) to the common electrode. When the gate voltage (gate-on voltage) is supplied to the gate line GL2, the thin film transistor TFT2 connected to the gate line GL2 is turned on, and the data voltage is supplied to the pixel electrode PIT2 through the source line SL2 connected to said thin film transistor TFT2. An electric field is generated by a difference between the data voltage supplied to the pixel electrode PIT2 and the common voltage Vcom supplied to the common electrode. A liquid crystal is driven by the electric field, and transmittance of the light emitted from the backlight BL is controlled, thereby displaying an image. In the second display panel LCP2, a monochrome image is displayed. In the second display panel LCP2, data voltage is simultaneously supplied with two pixel electrodes PIT2 connected to one gate line GL2 and one source line SL2.

Figure 6A:
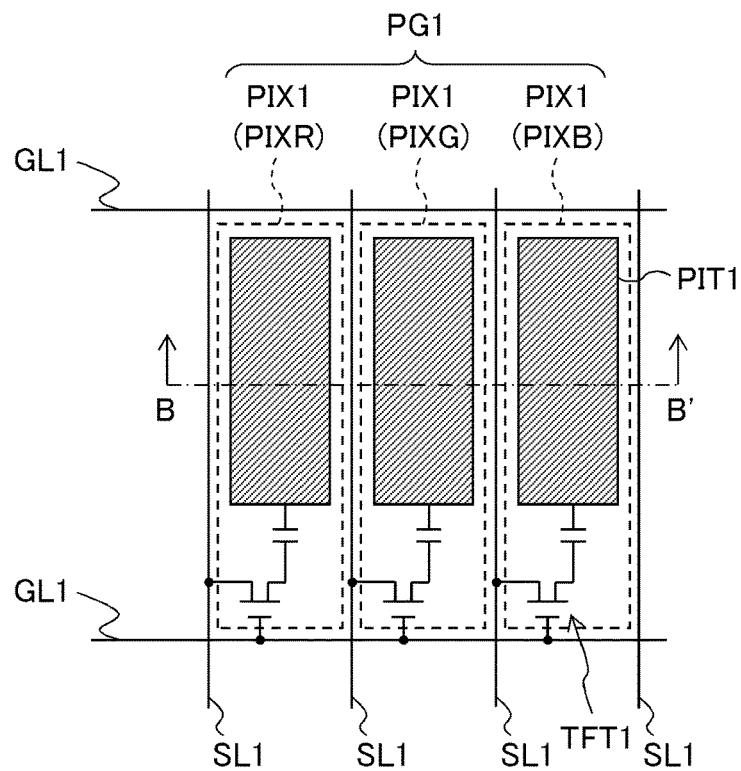
FIGS. 6A and 6B are plan views of the first exemplary embodiment, illustrating a relationship between a first pixel group of the first display panel and a second pixel group of the second display panel, the first pixel group and the second pixel group overlapping to each other.
Figure 6B:
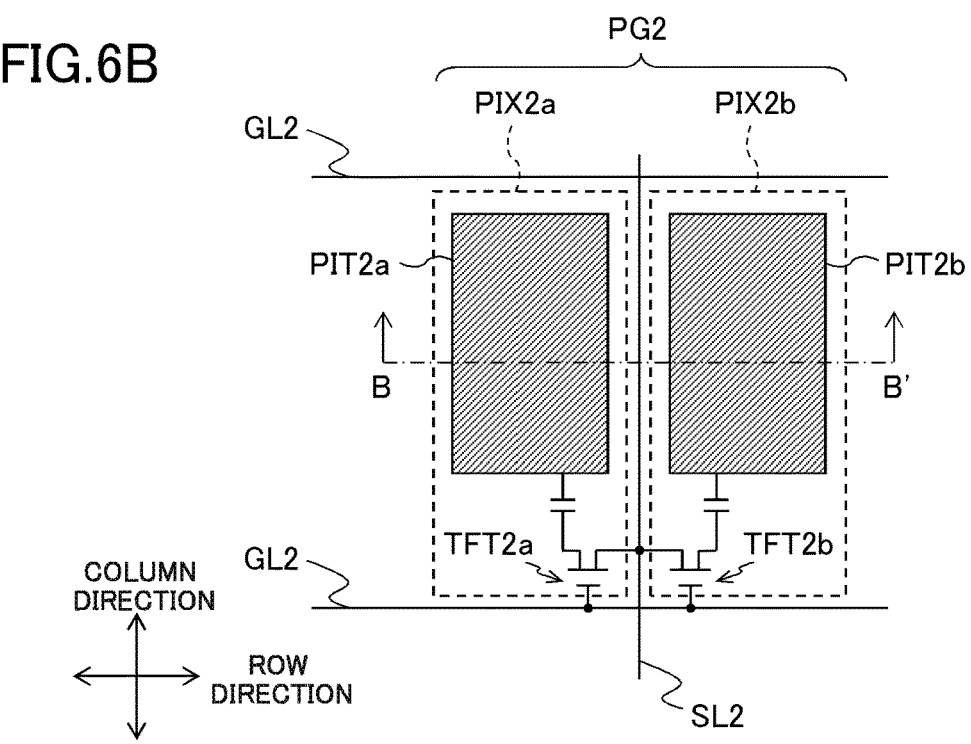

In the liquid crystal display device LCD, the number of pixels PIX2 per area of second display panel LCP2 is smaller than the number of pixels PIX1 per area of first display panel LCP1. FIGS. 6A and 6B are plan views illustrating a relationship between a first pixel group PG1 of the first display panel LCP1 and a second pixel group PG2 of the second display panel LCP2, with the first pixel group PG1 and the second pixel group PG2 overlapping to each other. Each first pixel PIX1 is provided with a corresponding first pixel electrode PIT1, and each pixel PIX2 is provided with a corresponding second pixel electrode PIT2.

As shown in FIG. 6, the number of first pixels PIX1 of the first display panel LCP1 and the number of pixels PIX2 of the second display panel LCP2 are satisfied with a three-to-two relationship. In this exemplary embodiment, the first pixel group PG1 of the first display panel LCP1 includes the red pixel PIXR, the green pixel PIXG and the blue pixel PIXB. The second pixel group PG2 of the second display panel LCP2 includes a second pixel PIX2a and a third pixel PIX2b. The first pixel group PG1 overlaps with the second pixel group PG2 in planar view. Namely, the red pixel PIXR, the green pixel PIXG and the blue pixel PIXB overlap with the second pixel PIX2a and the third pixel PIX2b in planar view. A total area of three first pixels PIX1 are almost same as a total area of two pixels PIX2.

In the example in FIG. 6, the second pixel PIX2a included in the second pixel group PG2 overlaps with the red pixel PIXR and the green pixel PIXG included in the first pixel group PG1 in planar view. The third pixel PIX2b included in the second pixel group PG2 overlaps with the green pixel PIXG and the blue pixel PIXB included in the first pixel group PG1 in planar view. Specifically, the second pixel PIX2a overlaps with a whole of the red pixel PIXR and a part of the green pixel PIXG. The third pixel PIX2b overlaps with the rest of the green pixel PIXG and a whole of the blue pixel PIXB included in the first pixel group PG1 in planar view.

In the second pixel PIX2a of the second display panel LCP2, a drain electrode of the second pixel electrode PIT2a and a drain electrode of the third pixel electrode PIT2b are electrically connected to the same second source line SL2. A gate electrode of the second pixel electrode PIT2a and a gate electrode of the third pixel electrode PIT2b are electrically connected to the same second gate line GL2. The second pixel electrode PIT2a is electrically connected to a source electrode of the second thin film transistor TFT2a, and the third pixel electrode PIT2b is electrically connected to a source electrode of the third thin film transistor TFT2b.

FIG. 7 is a sectional view taken along line B-B' in FIGS. 6A and 6B. Sectional structures of the pixels PIX1 and PIX2 will be described below with reference to FIG. 7.

In the thin film transistor substrate TFTB1 forming the first pixel PIX1 of the first display panel LCP1, the first gate lines GL1 (see FIG. 6) are formed on a transparent substrate SUB2 (glass substrate), and a gate insulating film GSN is formed so as to cover the first gate lines GL1. The first source lines SL1 are formed on the gate insulating film GSN, and a protective film PAS and an organic film OPAS are formed so as to cover the first source lines SL1. A common electrode CIT1 is formed on the organic film OPAS, and a protective film UPAS is formed so as to cover the common electrode CT1. The first pixel electrodes PIT1 are formed on the protective film UPAS, and an alignment film (not illus- trated) is formed so as to cover the first pixel electrodes PIT1. The first pixel electrode PIT1 is electrically connected to a source electrode of the first thin film transistor TFT1 (see, FIG. 6) via a contact hole (not shown). A plurality of slits extending in the column direction or the row direction may be formed in the first pixel electrode PIT1. In the opposing substrate CF1, the black matrix BM and the color filter layers FIL (red color filter layer FILR, green color filter layer FILG, and blue color filter layer FILB) are formed on a transparent substrate SUB1 (glass substrate). An overcoat film OC1 covers a surface of the color filter layers FIL, and an alignment film (not illustrated) is formed on the overcoat film OC1. Boundaries between color filter layers FIL adja- cent to each other overlap with the first source lines SL1 in planar view.

In the thin film transistor substrate TFTB2 forming the pixel PIX2 of the second display panel LCP2, the second gate lines GL2 (see FIG. 6) are formed on a transparent substrate SUB4 (glass substrate), and a gate insulating film GSN is formed so as to cover the second gate lines GL2. The second source lines SL2 are formed on the gate insulating film GSN, and a protective film PAS and an organic film OPAS are formed so as to cover the second source lines SL2. A common electrode CIT2 is formed on the organic film OPAS, and a protective film UPAS is formed so as to cover the common electrode CIT2. The pixel electrodes PIT2 are formed on the protective film UPAS, and an alignment film (not illustrated) is formed so as to cover the pixel electrodes PIT2. The pixel electrode PIT2 is electrically connected to a source electrode of the first thin film transistor TFT2 (see, FIG. 6) via a contact hole (not shown). A second source line SL2 disposed between the second pixel PIX2a and the third pixel PIX2b is positioned at the center of the first pixel PIX1 of the first display panel LCP1 in the row direction. In this exemplary embodiment, said second source line SL2 dis- posed between the second pixel PIX2a and the third pixel PIX2b is positioned at the center of the green pixel PIXG in the row direction. A plurality of slits extending in the column direction or the row direction may be formed in the pixel electrode PIT2. In the opposing substrate CF2, the black matrix BM2 is formed on a transparent substrate SUB3 (glass substrate). An overcoat film OC2 covers the black matrix BM2, and an alignment film (not illustrated) is formed on the overcoat film OC2. The black matrix BM2 overlap with the second source lines SL2 in planar view.

As described above, according to the first exemplary embodiment, the second pixel group PG2 of the second display panel LCP2 overlaps with a first pixel group PG1 of the first display panel LCP1 that includes the first color pixel PIXR, the second color pixel PIXG and the third color pixel PIXB in planar view. The second pixel group PG2 includes the second pixel PIX2a and the third pixel PIX2b. The second thin film transistor TFT2a of the second pixel PIX2a and the third thin film transistor TFT2b of the third pixel PIX2b are electrically connected to the same second source line SL2 and the same second gate line GL2. For example in the case that one pixel PIX2a of the second display panel LCP2 is defective, the other pixel PIX2b of the second display panel LCP2 can operate properly. Therefore, almost half of the first pixel group PG1 can continue to display the image. That is to say, a whole of the first pixel group PG1 can be prevented from becoming distorted.

Note that although a second source line SL2 disposed between the second pixel PIX2a and the third pixel PIX2b is positioned at the center of the green pixel PIXG in the row direction, said second source line SL2 may also be positioned at the center of the red pixel PIXR or the blue pixel PIXB in the row direction.

Second Exemplary Embodiment

A second exemplary embodiment of the present disclosure will be described below with reference to the drawings. For convenience, the same component as that of the first exemplary embodiment is designated by the same numeral, and the description will be omitted. In the second exemplary embodiment, the term defined in the first exemplary embodiment is used according to the definition of the first exemplary embodiment unless otherwise noted. The same holds true for the following exemplary embodiments.

Figure 8:
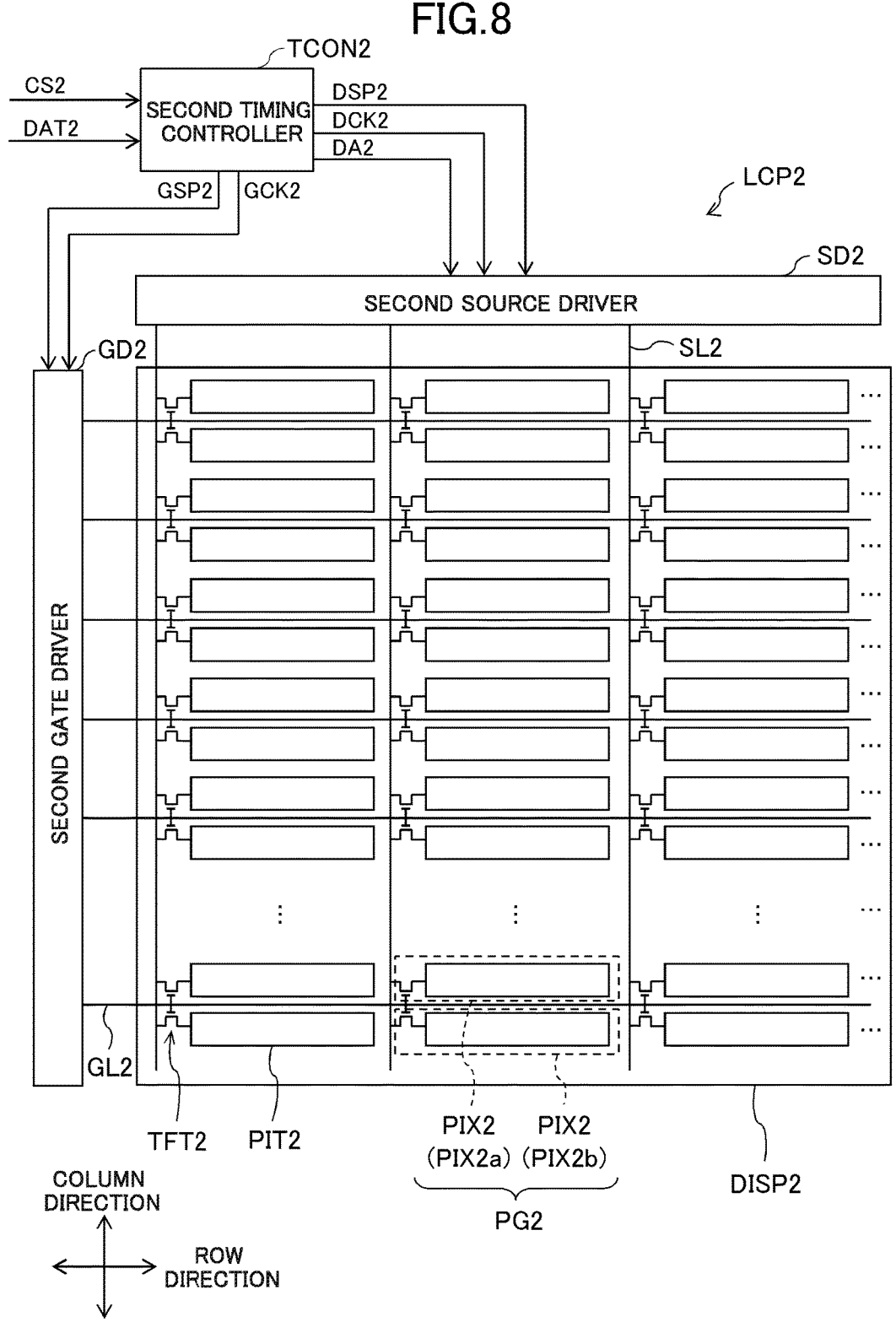
FIG. 8 is a plan view illustrating the schematic configuration of the liquid crystal display device according to a second exemplary embodiment.
Figure 9A:
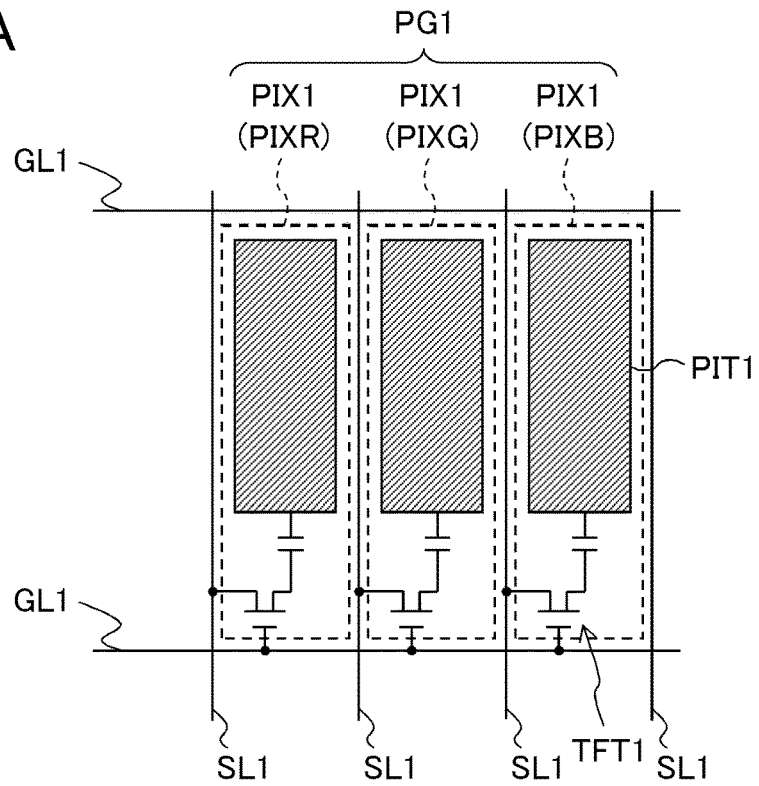
FIGS. 9A and 9B are plan views of the second exemplary embodiment, illustrating a relationship between a first pixel group of the first display panel and a second pixel group of the second display panel, the first pixel group and the second pixel group overlapping to each other.
Figure 9B:
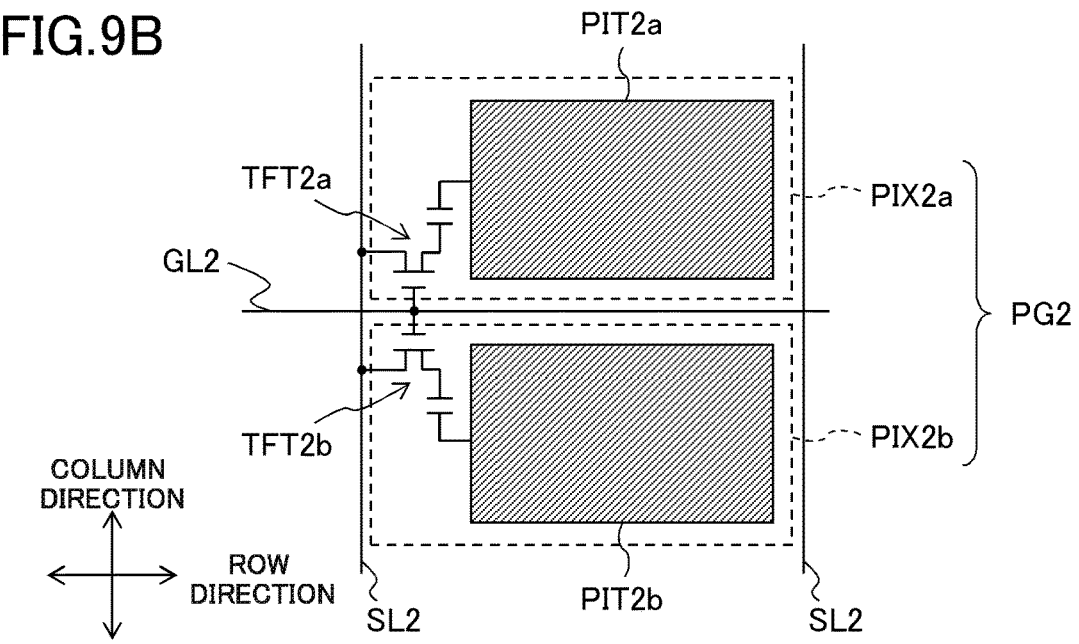

The first display panel LCP1 according to the second exemplary embodiment has a same structure as that of the first exemplary embodiment. FIG. 8 is a plan view illustrating the schematic configuration of the liquid crystal display device LCP2 according to the second exemplary embodiment. FIGS. 9A and 9B are plan views of the second exemplary embodiment, illustrating a relationship between a first pixel group PG1 of the first display panel LCP1 and the second pixel group PG2 of the second display panel LCP2.

In this exemplary embodiment, two pixels PIX2 (PIX2a, PIX2b) adjacent in the column direction are provided in a region surrounded by two second source lines SL2 adjacent to each other and two second gate lines GL2 adjacent to each other in planar view. Two thin film transistors TFT2 adjacent in the column direction sandwiching the gate line GL2 are electrically connected to a same gate line GL2 and a same source line SL2. In other words, two thin film transistors TFT2 disposed on either side of one gate line GL2 are electrically connected to the same source line SL2 and that gate line GL2. The thin film transistor TFT2 includes a drain electrode electrically connected to the source line SL2, a source electrode electrically connected to the pixel electrode PIT2, and a gate electrode electrically connected to the gate line GL2. Drain electrodes of the two thin film transistors TFT2 adjacent in the column direction through (sandwiching) the gate line GL2 are electrically connected to each other and to the same source line SL2. In the second display panel LCP2, data voltage is simultaneously supplied with two pixel electrodes PIT2 electrically connected to the one gate line GL2 and the one source line SL2.

As shown in FIGS. 9A and 9B, the number of first pixels PIX1 of the first display panel LCP1 and the number of pixels PIX2 of the second display panel LCP2 are satisfied with a three-to-two relationship. In this exemplary embodiment, a first pixel group PG1 of the first display panel LCP1 includes the red pixel PIXR, the green pixel PIXG and the blue pixel PIXB, and a second pixel group PG2 of the second display panel LCP2 includes a second pixel PIX2a and a third pixel PIX2b. The first pixel group PG1 overlaps with the second pixel group PG2 in planar view. Namely, the red pixel PIXR, the green pixel PIXG and the blue pixel PIXB overlaps with the second pixel PIX2a and the third pixel PIX2b in planar view. A total area of three first pixels PIX1 are almost same as a total area of two pixels PIX2.

In the example in FIGS. 9A and 9B, the second pixel PIX2a included in the second pixel group PG2 overlaps with a part of the red pixel PIXR, a part of the green pixel PIXG and a part of the blue pixel PIXB included in the first pixel group PG1 in planar view. The third pixel PIX2b included in the second pixel group PG2 overlaps with the rest of the red pixel PIXR, the rest of the green pixel PIXG and the rest of the blue pixel PIXB included in the first pixel group PG1 in planar view.

In the second pixel PIX2a of the second display panel LCP2, a drain electrode of the second pixel electrode PIT2a and a drain electrode of the third pixel electrode PIT2b are electrically connected to the same second source line SL2. A gate electrode of the second pixel electrode PIT2a and a gate electrode of the third pixel electrode PIT2b are electrically connected to the same second gate line GL2. The second pixel electrode PIT2a is electrically connected to a source electrode of the second thin film transistor TFT2a, and the third pixel electrode PIT2b is electrically connected to a source electrode of the third thin film transistor TFT2b.

According to the second exemplary embodiment, the second pixel group PG2 of the second display panel LCP2, overlaps with the first pixel group PG1 of the first display panel LCP1 that includes the first color pixel PIXR, the second color pixel PIXG and the third color pixel PIXB in planar view. The second pixel group PG2 includes the second pixel PIX2a and the third pixel PIX2b. The second thin film transistor TFT2a of the second pixel PIX2a and the third thin film transistor TFT2b of the third pixel PIX2b are electrically connected to the same second source line SL2 and the same second gate line GL2. For example in the case that one pixel PIX2a of the second display panel LCP2 is defective, the other pixel PIX2b of the second display panel LCP2 can operate properly. Therefore, almost half of the first pixel group PG1 can continue to display the image. That is to say, a whole of the first pixel group PG1 can be prevented from becoming distorted when a defective pixel arises in the second display panel LCP2. In addition, because the almost half of the first pixel group PG1 includes a half of the first color pixel PIXR, a half of the second color pixel PIXG and a half of the third color pixel PIXB, a color balance is maintained even if a defective pixel arises in the second display panel LCP2.

Third Exemplary Embodiment

Figure 10:
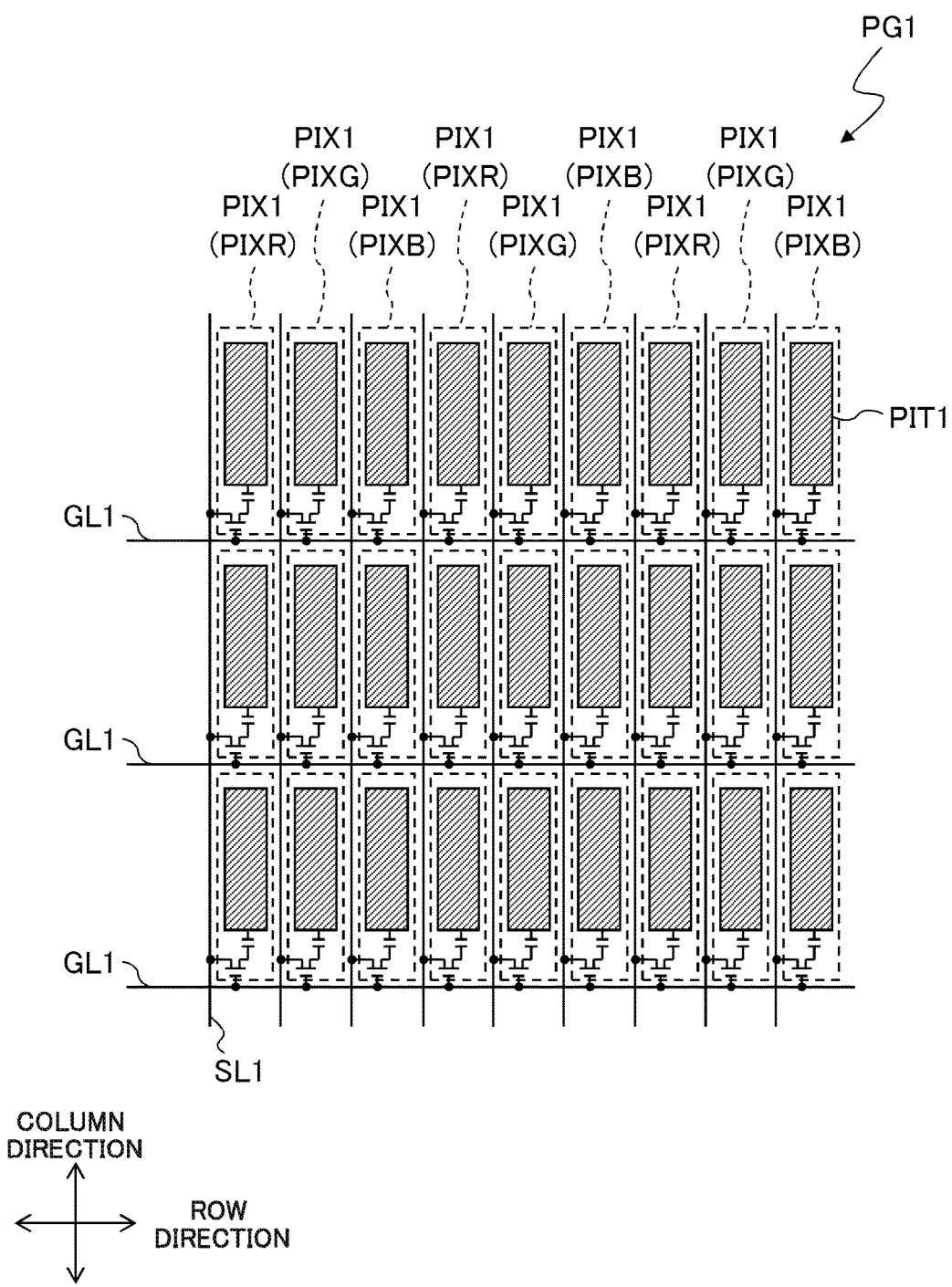
FIG. 10 is a plan view illustrating a first pixel group of the first display panel according to a third exemplary embodiment.
Figure 11:
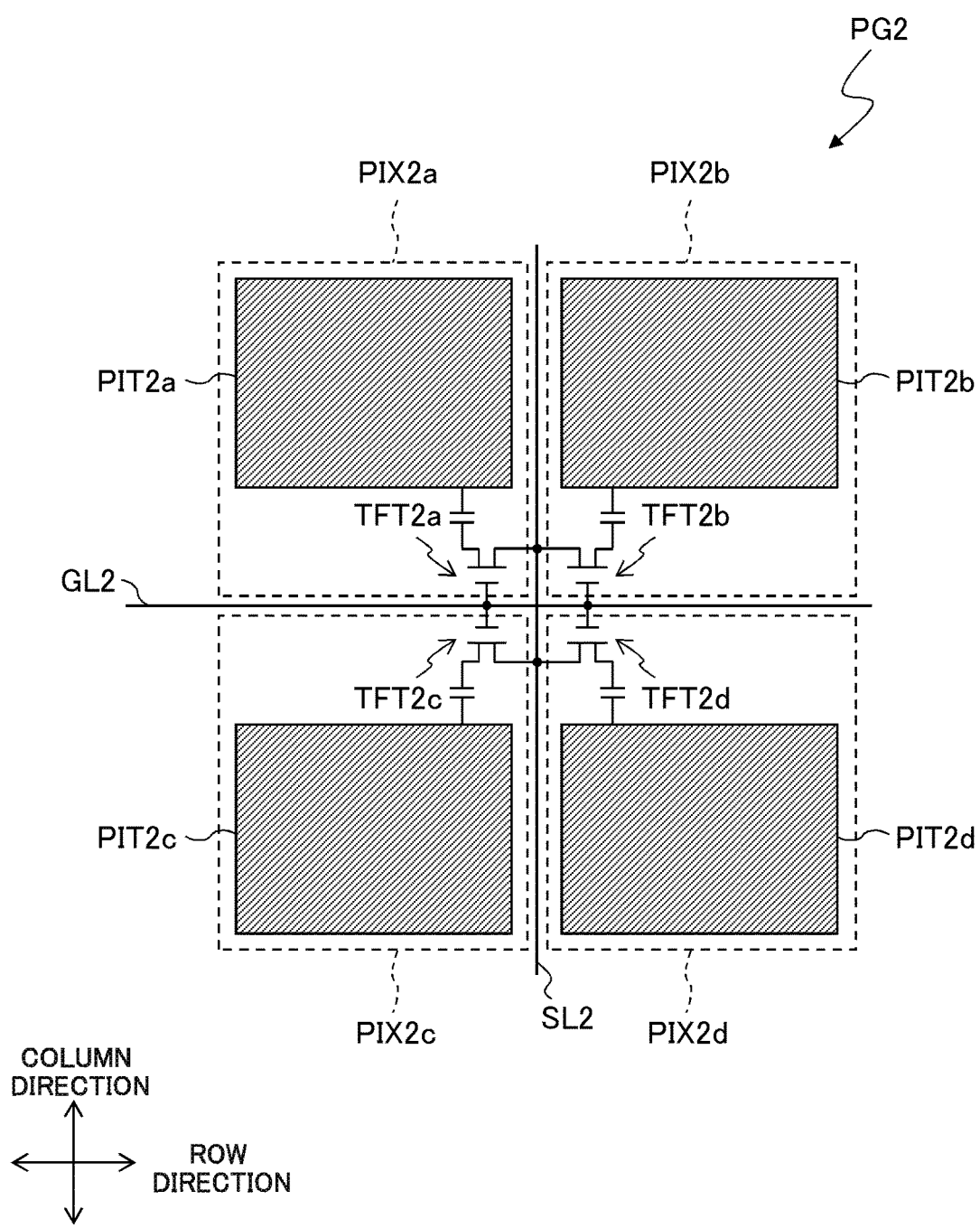
FIG. 11 is a plan view illustrating a second pixel group of the second display panel according to the third exemplary embodiment.
Figure 12:
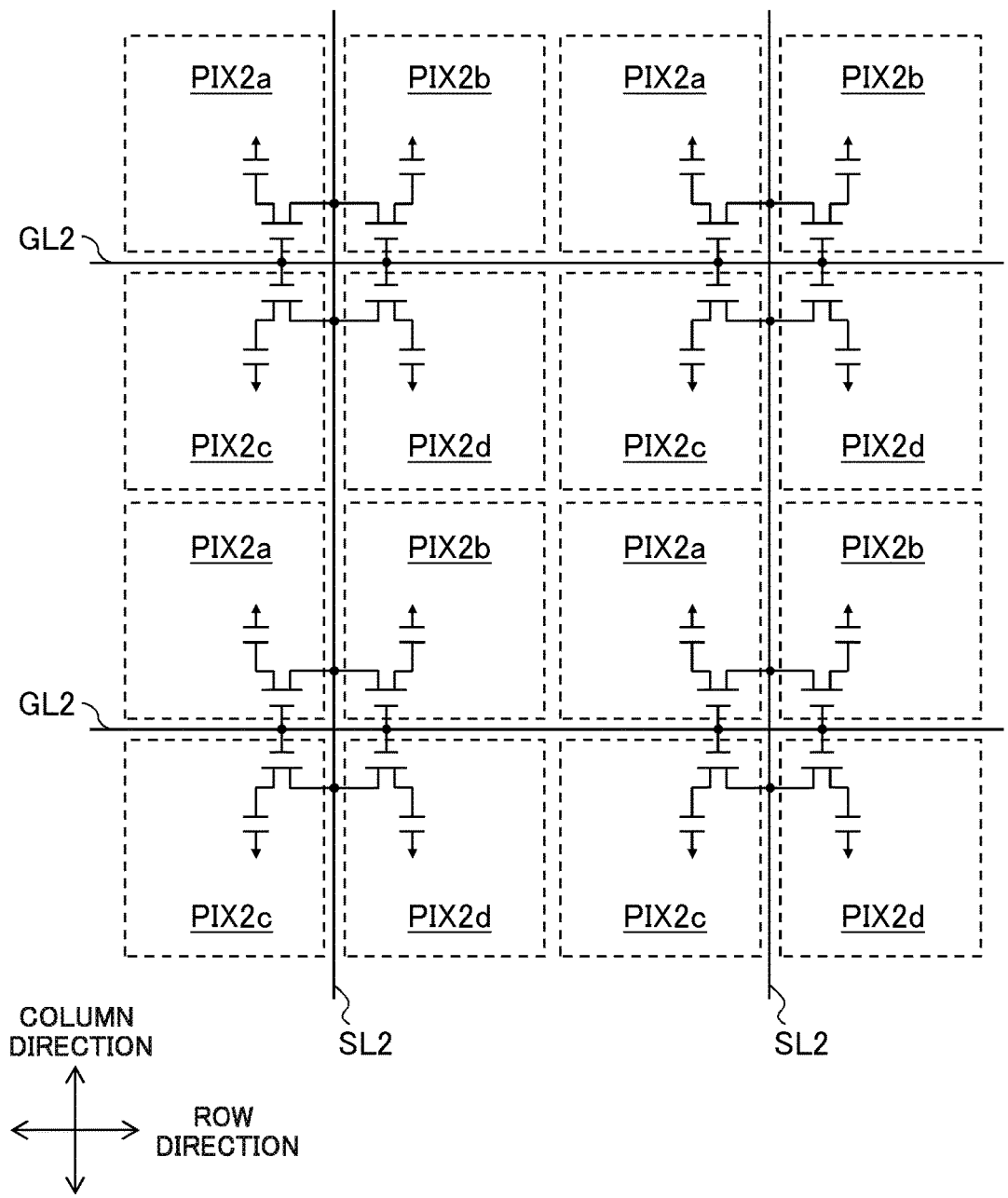
FIG. 12 is a plan view illustrating arrangement of the second pixel group of the second display panel according to the third exemplary embodiment.

FIG. 10 is a plan view illustrating the schematic configuration of the first pixel group PG1 of the first display panel LCP1 according to a third exemplary embodiment. FIG. 11 is a plan view illustrating the schematic configuration of the second pixel group PG2 of the liquid crystal display device LCP2 according to the third exemplary embodiment. FIG. 12 is a plan view illustrating arrangement of pixels in the second display panel LCP2 according to the third exemplary embodiment.

In this exemplary embodiment, the number of first pixels PIX1 of the first display panel LCP1 and the number of pixels PIX2 of the second display panel LCP2 are satisfied with a twenty-seven-to-four relationship. As shown in FIG. 10, one first pixel group PG1 of the first display panel LCP1 includes twenty-seven first pixels PIX1 including nine red pixels PIXR, nine green pixels PIXG and nine blue pixels PIXB. As shown in FIG. 11, one second pixel group PG2 of the second display panel LCP2 includes four pixels PIX2 including a second pixel PIX2a, a third pixel PIX2b, a fourth pixel PIX2c and a fifth pixel PIX2d. One first pixel group PG1 of the first display panel LCP1 overlaps with one second pixel group PG2 of the second display panel LCP2 in planar view.

As shown in FIG. 11, the second pixel PIX2a and the third pixel PIX2b are adjacent in the row direction through (sandwiching) a second source line SL2, the fourth pixel PIX2c and the fifth pixel PIX2d are adjacent in the row direction through (sandwiching) a second source line SL2. The second pixel PIX2a and the fourth pixel PIX2c are adjacent in the column direction through (sandwiching) a second gate line GL2, the third pixel PIX2c and the fifth pixel PIX2d are adjacent in the column direction through (sandwiching) a second gate line GL2. Each of gate electrodes (control electrodes) of the second thin film transistor TFT2a, the third thin film transistor TFT2b, the fourth thin film transistor TFT2c and the fifth thin film transistor TFT2d are electrically connected to a same second gate line GL2. Each of drain electrodes of the second thin film transistor TFT2a, the third thin film transistor TFT2b, the fourth thin film transistor TFT2c and the fifth thin film transistor TFT2d are electrically connected to a same second source line SL2. A source electrode of the second thin film transistor TFT2a is electrically connected to the second pixel electrode PIT2a. A source electrode of the third thin film transistor TFT2b is electrically connected to the third pixel electrode PIT2b. A source electrode of the fourth thin film transistor TFT2c is electrically connected to the fourth pixel electrode PIT2c. A source electrode of the fifth thin film transistor TFT2d is electrically connected to the fifth pixel electrode PIT2d. In the second display panel LCP2, data voltage is simultaneously supplied with four pixel electrodes PIT2a-PIT2d connected to the one gate line GL2 and the one source line SL2.

According to the third exemplary embodiment, the second pixel group PG2 of the second display panel LCP2, overlaps with the first pixel group PG1 of the first display panel LCP1 that includes the first color pixel PIXR, the second color pixel PIXG and the third color pixel PIXB. The second pixel group PG2 includes the second pixel PIX2a, the third pixel PIX2b, the fourth pixel PIX2c and the fifth pixel PIX2d. The second thin film transistor TFT2a of the second pixel PIX2a, the third thin film transistor TFT2b of the third pixel PIX2b, the fourth thin film transistor TFT2c of the fourth pixel PIX2c and the fifth thin film transistor TFT2d of the fifth pixel PIX2d are electrically connected to the same second source line SL2 and the same second gate line GL2. For example in the case that one pixel PIX2a of the second display panel LCP2 is defective, the other pixels PIX2b-2d of the second display panel LCP2 can operate properly. Therefore, almost three quarters of the first pixel group PG1 can continue to display the image. That is to say, a whole of the first pixel group PG1 can be prevented from becoming distorted when a defective pixel arises in the second display panel LCP2.

Figure 13:
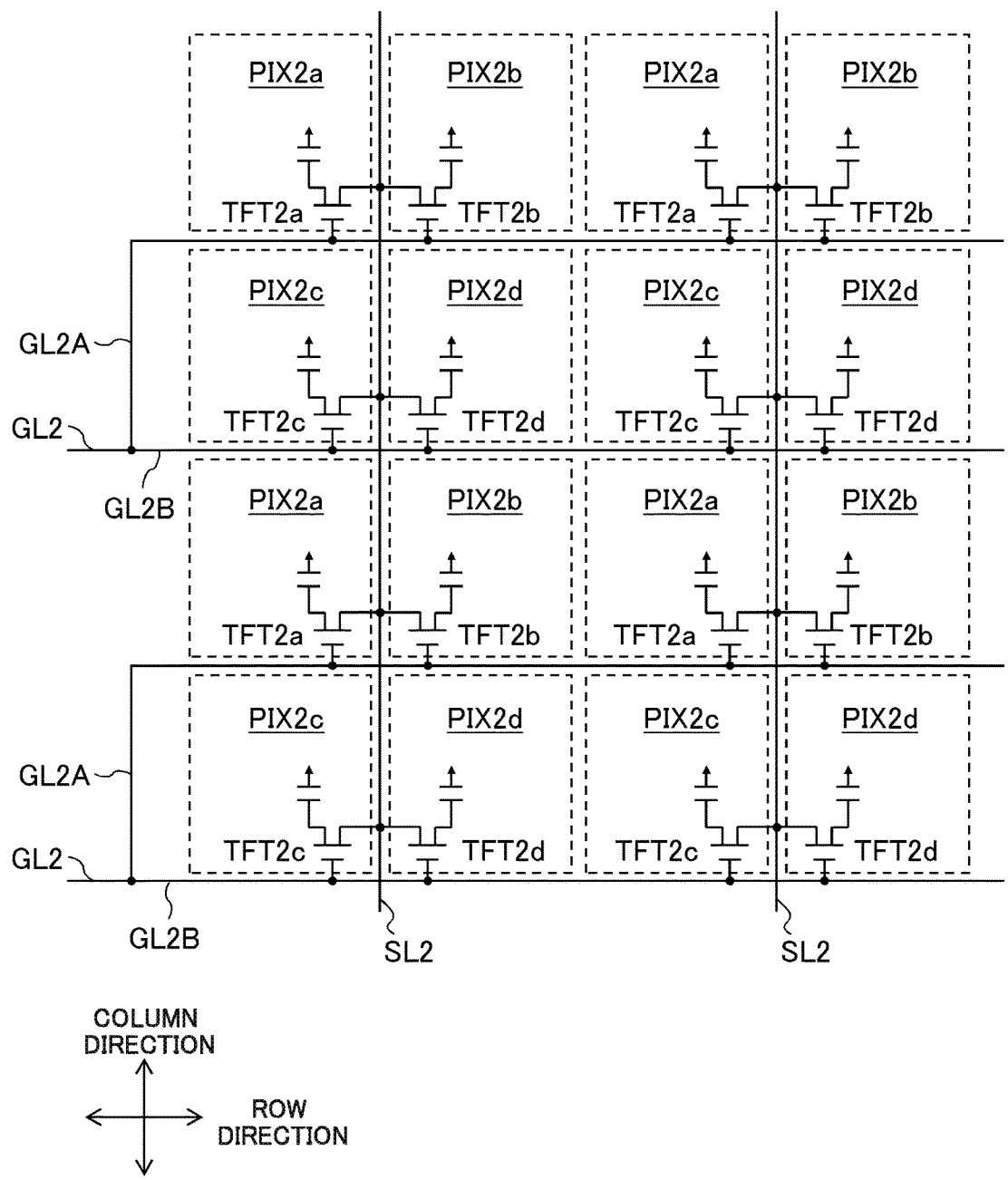
FIG. 13 is a plan view illustrating a variation of the second display panel according to the third exemplary embodiment.

The second display panel LCP2 according to the third exemplary embodiment is not limited to above structures. FIG. 13 is a plan view illustrating a variation of the second display panel LCP2 according to the third exemplary embodiment. As shown in FIG. 13, each second gate line GL2 includes a first branch gate line GL2a and a second branch gate line GL2b. Each of gate electrodes of a thin film transistor TFT2a and a thin film transistor TFT2b are electrically connected to the first branch gate line GL2a. Each of gate electrodes of a thin film transistor TFT2c and a thin film transistor TFT2d are electrically connected to the second branch gate line GL2b.

Fourth Exemplary Embodiment

Figure 14A:
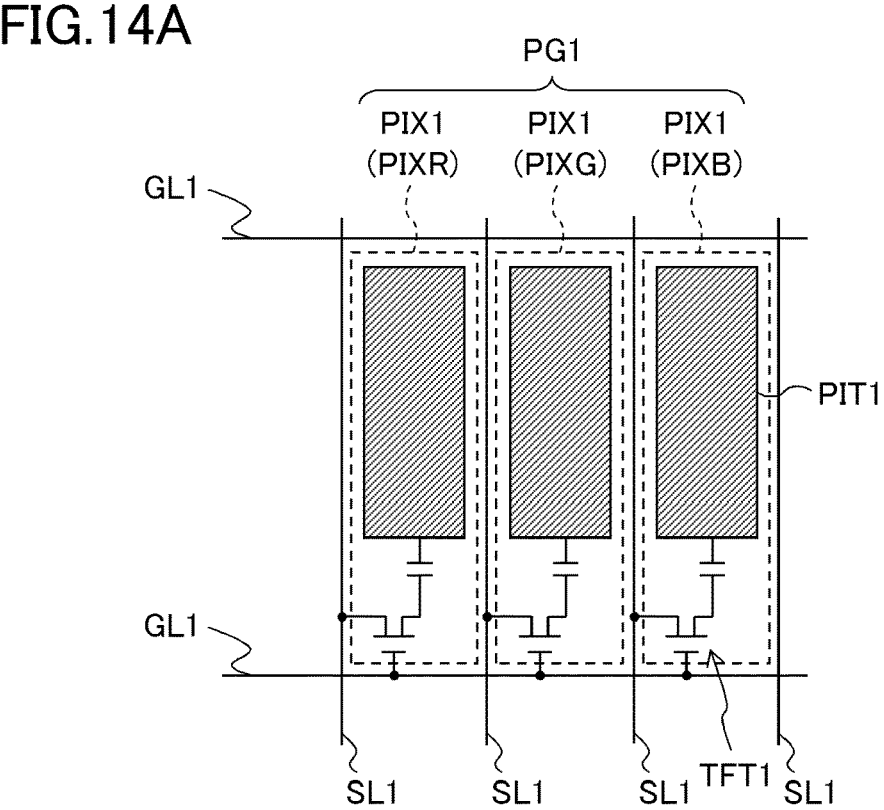
FIGS. 14A and 14B are plan views of a forth exemplary embodiment, illustrating a relationship between a first pixel group of the first display panel and a second pixel group of the second display panel.
Figure 14B:
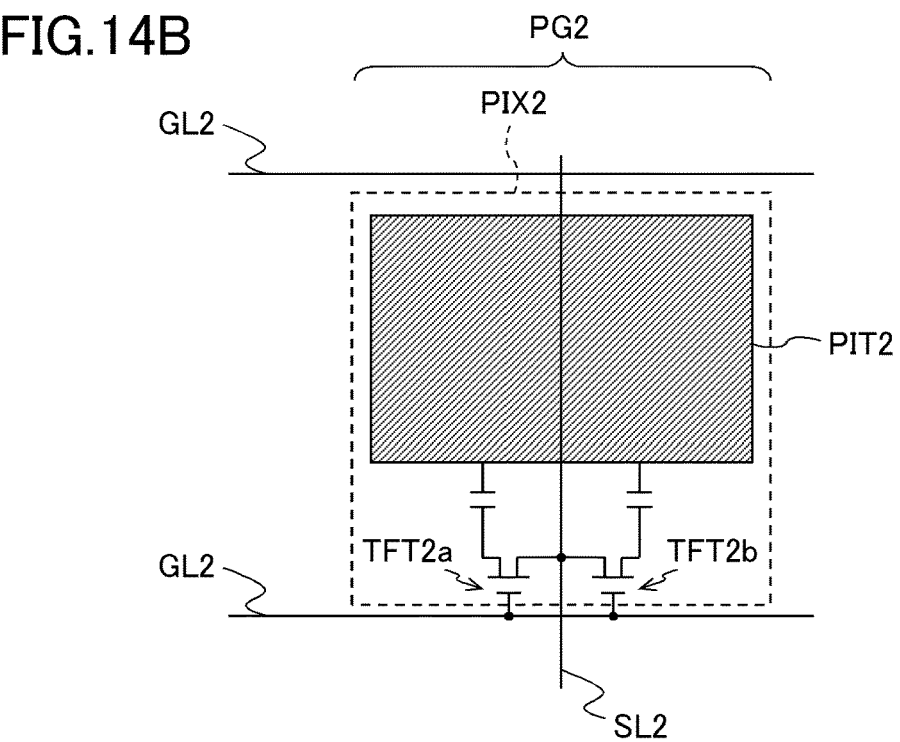

FIGS. 14A and 14B are plan views of a fourth exemplary embodiment illustrating a relationship between a first pixel group PG1 of the first display panel LCP1 and a second pixel group PG2 of the second display panel LCP2, with the first pixel group PG1 and the second pixel group PG2 overlapping to each other. The first display panel LCP1 according to the fourth exemplary embodiment has a same structure as that of the first exemplary embodiment (see, FIG. 3).

In this exemplary embodiment, two thin film transistors TFT2a and TFT2b disposed on either side of one source line SL2 are connected to one pixel electrode PIT2 that crosses over that source line SL2. Each of gate electrodes (control electrodes) of two thin film transistors TFT2a and TFT2b which are adjacent in the row direction through (sandwiching) a second source line SL2 is electrically connected to a same second gate line GL2. Each of drain electrodes of the two thin film transistors TFT2a and TFT2b is electrically connected to said second source line SL2. Each of source electrodes of the two thin film transistors TFT2a and TFT2b is electrically connected to a same pixel electrode PIT2. In the second display panel LCP2, data voltage is supplied with one pixel electrode PIT2 connected to the one gate line GL2 and the one source line SL2, via two thin film transistors TFT2a and TFT2b.

As shown in FIGS. 14A and 14B, the number of first pixels PIX1 of the first display panel LCP1 and the number of pixels PIX2 of the second display panel LCP2 are satisfied with a three-to-one relationship. One first pixel group PG1 of the first display panel LCP1 includes a red pixel PIXR, a green pixel PIXG and a blue pixel PIXB. One second pixel group PG2 of the second display panel LCP2 includes one pixel PIX2. One first pixel group PG1 of the first display panel LCP1 overlaps with one second pixel group PG2 of the second display panel LCP2 in planar view. A total area of three first pixels PIX1 are almost same as a total area of one pixel PIX2.

According to the forth exemplary embodiment, the second pixel group PG2 of the second display panel LCP2, overlaps with a first pixel group PG1 of the first display panel LCP1 that includes the first color pixel PIXR, the second color pixel PIXG and the third color pixel PIXB. The second pixel group PG2 includes one pixel PIX2. The thin film transistors TFT2a and TFT2b are electrically connected to the same second source line SL2 and the same second gate line GL2. For example in the case that one thin film transistor TFT2a of the second display panel LCP2 is defective, the other thin film transistor TFT2b of the second display panel LCP2 can operate properly. Therefore, the pixel electrode PIT2 electrically connected to the two thin film transistors TFT2a and TFT2b can receive data voltage via the other thin film transistor TFT2b, thus, the first pixel group PG1 can continue to display the image. That is to say, a whole of the first pixel group PG1 can be prevented from becoming distorted when a defective thin film transistor TFT2 arises in the second display panel LCP2.

Figure 15A:
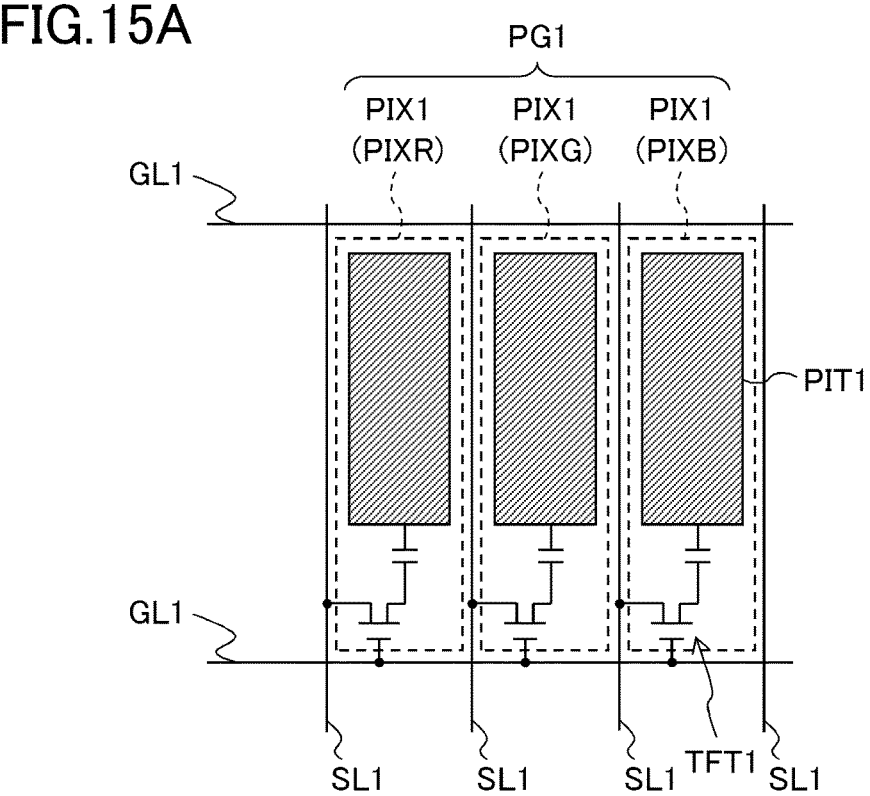
FIGS. 15A and 15B are plan views illustrating a variation of the second pixel group of the second display panel according to the forth exemplary embodiment.
Figure 15B:
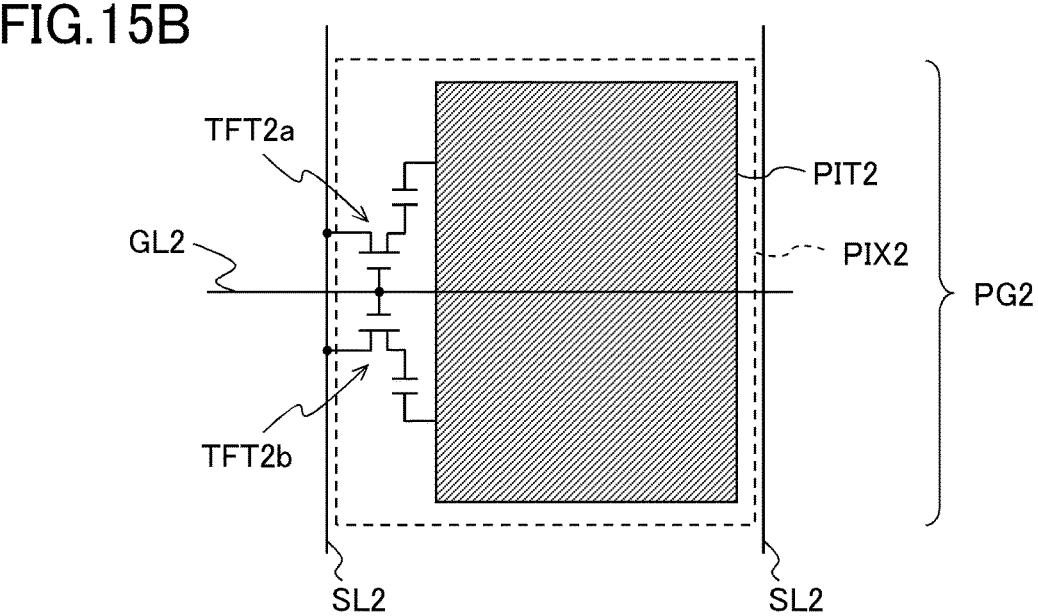

The second display panel LCP2 according to the forth exemplary embodiment is not limited to above structures. FIGS. 15A and 15B are plan views illustrating a variation of the second display panel LCP2 according to the forth exemplary embodiment. As shown in FIGS. 15A and 15B, each of gate electrodes (control electrodes) of two thin film transistors TFT2a and TFT2b which are adjacent in the column direction through (sandwiching) a second gate line GL2 is electrically connected to said second gate line GL2. Each of drain electrodes of the two thin film transistors TFT2a and TFT2b is electrically connected to a same second source line SL2. Each of source electrodes of the two thin film transistors TFT2a and TFT2b is electrically connected to a same pixel electrode PIT2. In the second display panel LCP2 shown in FIG. 15, data voltage is supplied with one pixel electrode PIT2 electrically connected to the one gate line GL2 and the one source line SL2, via two thin film transistors TFT2a and TFT2b.

Figure 16A:
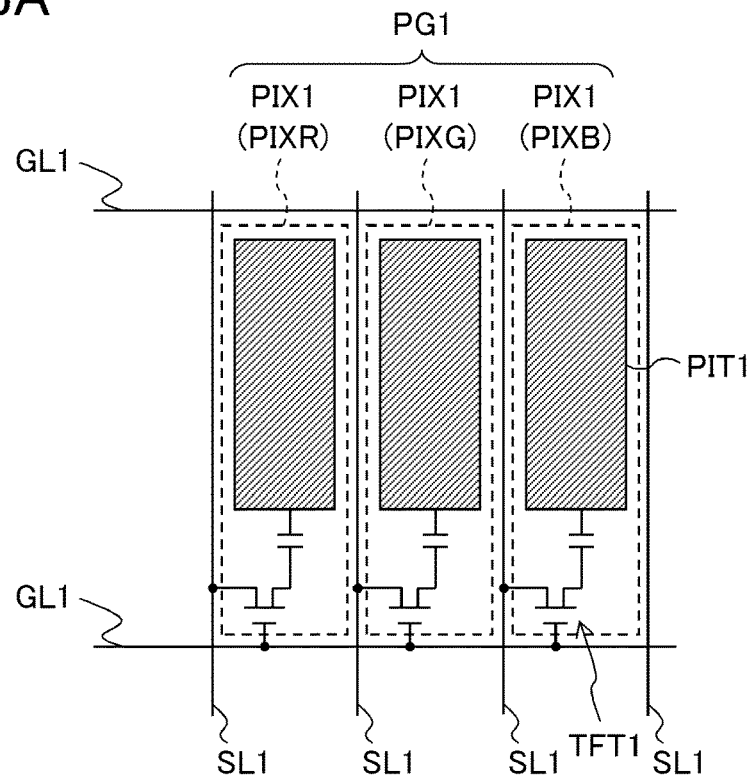
FIGS. 16A and 16B are plan views illustrating a variation of the second pixel group of the second display panel according to the forth exemplary embodiment.
Figure 16B:
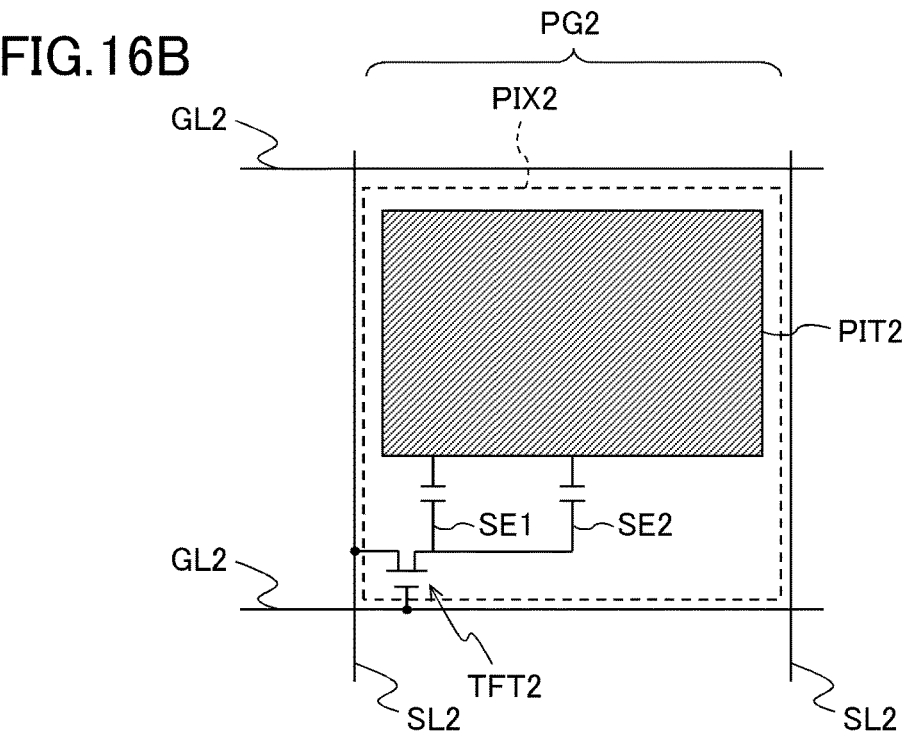

FIGS. 16A and 16B are plan views illustrating another variation of the second display panel LCP2 according to the forth exemplary embodiment. As shown in FIGS. 16A and 16B, one pixel electrode PIT2 (one pixel PIX2) and one thin film transistor TFT2 are provided in a region surrounded by two second source lines SL2 adjacent to each other and two second gate lines GL2 adjacent to each other in planar view. A gate electrode (control electrode) of the thin film transistor TFT2 is electrically connected to the second gate line GL2, a drain electrode (first conductive electrode) of the thin film transistor TFT2 is electrically connected to the second source line SL2. A source electrode (second conductive electrode) of the thin film transistor TFT2 includes a first branch electrode SE1 and a second branch electrode SE1. The first branch electrode SE1 and the second branch electrode SE1 are electrically connected to a same pixel electrode PIT2. In the second display panel LCP2 shown in FIG. 16, data voltage is supplied with one pixel electrode PIT2 connected to the one gate line GL2 and the one source line SL2, via the first branch electrode SE1 and the second branch electrode SE1 of the thin film transistor TFT2.

According to the variation shown in FIG. 16, the second pixel group PG2 of the second display panel LCP2 overlaps with a first pixel group PG1 of the first display panel LCP1 that includes the first color pixel PIXR, the second color pixel PIXG and the third color pixel PIXB in planar view. The second pixel group PG2 consists of one pixel PIX2. A source electrode (second conductive electrode) of the thin film transistor TFT2 includes a first branch electrode SE1 and a second branch electrode SE1 which are electrically connected to the same pixel electrode PIT2. For example in the case that a contact area between the first branch electrode SE1 and the pixel electrode PIT2 is defective, the second branch electrode SE2 can supply data voltage with the pixel electrode PIT2. Thus, a whole of the first pixel group PG1 can be prevented from becoming distorted when a defective branch electrode SE1 arises in the second display panel LCP2.

Figure 17:
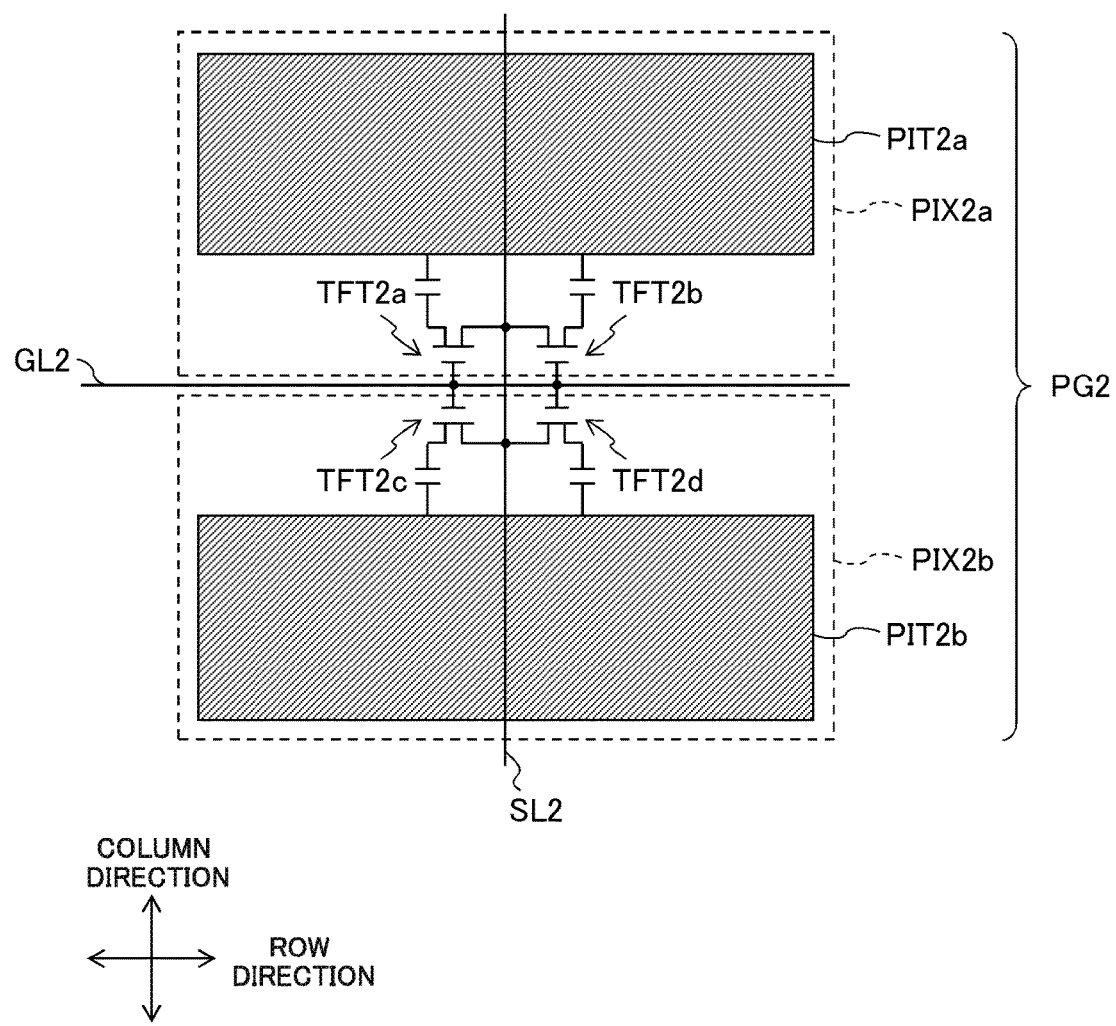
FIG. 17 is a plan view illustrating a variation of the second pixel group of the second display panel according to the forth exemplary embodiment.

FIG. 17 is a plan view illustrating another variation of the second display panel LCP2 according to the forth exemplary embodiment. As shown in FIG. 17, a second pixel group PG2 of the second display panel LCP2 may include two pixels PIX2 (PIX2a, PIX2b). The second pixel PIX2a and the third pixel PIX2b are adjacent to each other in the column direction through (sandwiching) a second gate line GL2. Each of gate electrodes (control electrodes) of a second thin film transistor TFT2a, a third thin film transistor TFT2b, a fourth thin film transistor TFT2c and a fifth thin film transistor TFT2d are electrically connected to a same second gate line GL2. Each of drain electrodes of the second thin film transistor TFT2a, the third thin film transistor TFT2b, the fourth thin film transistor TFT2c and the fifth thin film transistor TFT2d are electrically connected to a same second source line SL2. Each of source electrodes of the second thin film transistor TFT2a and the third thin film transistor TFT2b is electrically connected to the second pixel electrode PIT2a. Each of source electrodes of the fourth thin film transistor TFT2c and the fifth thin film transistor TFT2d is electrically connected to the third pixel electrode PIT2b. In the second display panel LCP2, data voltage is supplied with the second pixel electrode PIT2a via the second thin film transistor TFT2a and the third thin film transistor TFT2b, and data voltage is supplied with the third pixel electrode PIT2b via the fourth thin film transistor TFT2c and the fifth thin film transistor TFT2d.

According to the variation shown in FIG. 17, the second pixel group PG2 of the second display panel LCP2 overlaps with the first pixel group PG1 of the first display panel LCP1 that includes the first color pixel PIXR, the second color pixel PIXG and the third color pixel PIXB in planar view. The second pixel group PG2 includes the second pixel PIX2a and the third pixel PIX2b. The thin film transistors TFT2a, TFT2b of the second pixel PIX2a and the thin film transistors TFT2c, TFT2d of the third pixel PIX2b are electrically connected to the same second source line SL2 and the same second gate line GL2. For example in the case that one pixel PIX2a of the second display panel LCP2 is defective, the other pixel PIX2b of the second display panel LCP2 can operate properly. Therefore, almost half of the first pixel group PG1 can continue to display the image. Also, for example in the case that one thin film transistor TFT2a of the second display panel LCP2 is defective, the other thin film transistors TFT2b-2d of the second display panel LCP2 can operate properly. Therefore, the pixel electrodes PIT2a, PIT2b electrically connected to these thin film transistors TFT2a-TFT2d can receive data voltage via the other thin film transistors TFT2b-TFT2d. thus, the first pixel group PG1 can continue to display the image. That is to say, a whole of the first pixel group PG1 can be prevented from becoming distorted.

Figure 18:
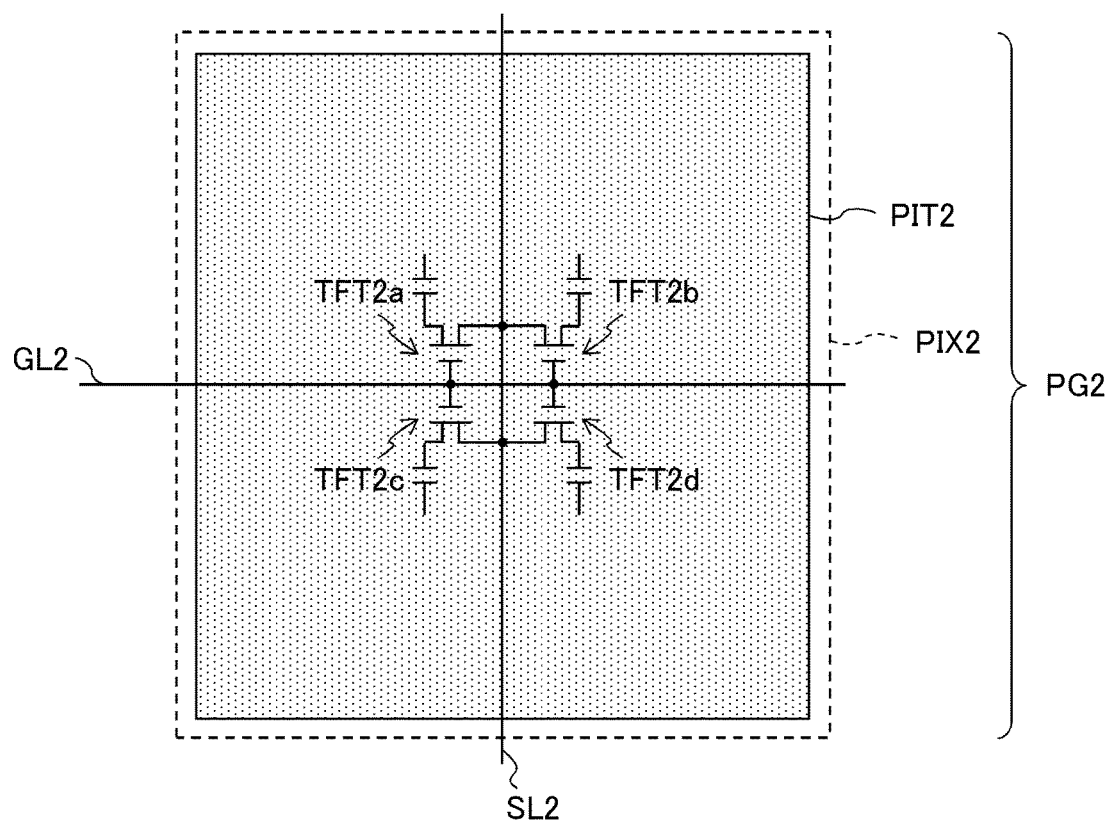
FIG. 18 is a plan view illustrating a variation of the second pixel group of the second display panel according to the forth exemplary embodiment.

FIG. 18 is a plan view illustrating another variation of the second display panel LCP2 according to the forth exemplary embodiment. As shown in FIG. 18, a second pixel group PG2 of the second display panel LCP2 may consist of one pixel PIX2, and the one pixel PIX2 is connected to four thin film transistors TFT2a-TFT2d. Each of gate electrodes (control electrodes) of a second thin film transistor TFT2a, a third thin film transistor TFT2b, a fourth thin film transistor TFT2c and a fifth thin film transistor TFT2d are electrically connected to the a second gate line GL2. Each of drain electrodes of the second thin film transistor TFT2a, the third thin film transistor TFT2b, the fourth thin film transistor TFT2c and the fifth thin film transistor TFT2d are electrically connected to a same second source line SL2. Each of source electrodes of the second thin film transistor TFT2a, the third thin film transistor TFT2b, the fourth thin film transistor TFT2c and the fifth thin film transistor TFT2d is electrically connected to the pixel electrode PIT2. In the second display panel LCP2, data voltage is supplied with the pixel electrode PIT2 via four thin film transistors TFT2a-TFT2d.

According to the variation shown in FIG. 18, the second pixel group PG2 of the second display panel LCP2 overlaps with the first pixel group PG1 of the first display panel LCP1 that includes the first color pixel PIXR, the second color pixel PIXG and the third color pixel PIXB in plenary view. The second pixel group PG2 includes one pixel PIX2. The thin film transistors TFT2a-TFT2d of the pixel PIX2 are electrically connected to the same second source line SL2 and the same second gate line GL2. For example in the case that one thin film transistor TFT2a of the second display panel LCP2 is defective, the other thin film transistors TFT2b-2d of the second display panel LCP2 can operate properly. Therefore, the pixel electrode PIT2 electrically connected to these thin film transistors TFT2a-TFT2d can receive data voltage via the other thin film transistors TFT2b-TFT2d. Thus, the first pixel group PG1 can continue to display the image. That is to say, a whole of the first pixel group PG1 can be prevented from becoming distorted when a defective thin film transistor TFT2 arises in the second display panel LCP2.

In the above, the specific embodiments of the present application have been described, but the present application is not limited to the above-mentioned embodiments, and various modifications may be made as appropriate without departing from the spirit of the present application.

What is claimed is:

1. A liquid crystal display device comprising:
 a first display panel that includes a plurality of first source lines extending in a first direction and a plurality of first gate lines extending in a second direction different from the first direction; and
 a second display panel opposing the first display panel that includes a plurality of second source lines extending in the first direction and a plurality of second gate lines extending in the second direction, wherein
 each of the first display panel and the second display panel includes a plurality of thin film transistors, and a plurality of pixel electrodes of which each is electrically connected to a corresponding one of the plurality of thin film transistors, and
 in the second display panel, at least two thin film transistors of the plurality of thin film transistors are electrically connected to a same second source line among the plurality of second source lines and a same second gate line among the plurality of second gate lines.

2. The liquid crystal display device according to claim 1, wherein
 the plurality of thin film transistors of the first display panel include first thin film transistors, the plurality of pixel electrodes of the first display panel include first pixel electrodes that are electrically connected to a corresponding one of the first thin film transistors,
 each of a plurality of first pixels are defined by a driving area of a corresponding one of the plurality of first pixel electrodes in the first display panel,
 the plurality of thin film transistors of the second display panel include second thin film transistors and third thin film transistors, the plurality of pixel electrodes of the second display panel include second pixel electrodes that are electrically connected to a corresponding one of the second thin film transistors and third pixel electrodes that are electrically connected to a corresponding one of the third thin film transistors,
 each of a plurality of second pixels are defined by a driving area of a corresponding one of the plurality of second pixel electrodes in the second display panel,
 each of a plurality of third pixels are defined by a driving area of a corresponding one of the plurality of third pixel electrodes in the second display panel,
 the plurality of first pixels includes a plurality of first color pixels corresponding to a first color, a plurality of second color pixels corresponding to a second color different from the first color, and a plurality of third color pixels corresponding to a third color different from the first color and the second color,
 a first pixel group that includes one first color pixel of the plurality of first color pixels, one second color pixel of the plurality of second color pixels and one third color pixel of the plurality of third color pixels overlaps with a second pixel group that includes one second pixel of the plurality of second pixels and one third pixel of the plurality of third pixels in planar view, and
 one second thin film transistor of the plurality of second thin film transistors and one third thin film transistor of the plurality of third thin film transistors are electrically connected to a same second source line of the plurality of second source lines and a same second gate line of the plurality of second gate lines.

3. The liquid crystal display device according to claim 2, wherein
 each of the plurality of first color pixels, each of the plurality of second color pixels and each of the plurality of third color pixels are arranged in the second direction, and
 each of the plurality of second pixels and each of the plurality of third pixels are arranged in the first direction or the second direction.

4. The liquid crystal display device according to claim 2, wherein
 the thin film transistors of the second display panel further include a plurality of fourth thin film transistors and a plurality of fifth thin film transistors, a plurality of fourth pixel electrodes of which each is electrically connected to a corresponding one of the plurality of fourth thin film transistors, and a plurality of fifth pixel electrodes of which each is electrically connected to a corresponding one of the plurality of fifth thin film transistors,
 each of a plurality of fourth pixels are defined by a driving area of a corresponding one of the plurality of fourth pixel electrodes in the second display panel,
 each of a plurality of fifth pixels are defined by a driving area of a corresponding one of the plurality of fifth pixel electrodes in the second display panel,
 the second pixel group includes one of the plurality of fourth pixels and one of the plurality of fifth pixels in addition to one of the plurality of second pixels and one of the plurality of third pixels, and
 one second pixel electrode of the plurality of second pixel electrodes, one third pixel electrode of the plurality of third pixel electrodes, one fourth pixel electrode of the plurality of fourth pixel electrodes and one fifth pixel electrode of the plurality of fifth pixel electrodes are electrically connected to a same second gate line and a same second source line.

5. The liquid crystal display device according to claim 1, wherein
 the thin film transistors of the first display panel include a plurality of first thin film transistors, the pixel electrodes of the first display panel include first pixel electrodes that are electrically connected to a corresponding one of the first thin film transistors,
 each of a plurality of first pixels are defined by a driving area of a corresponding one of the plurality of first pixel electrodes in the first display panel,
 the thin film transistors of the second display panel include a plurality of second thin film transistors and a plurality of third thin film transistors,
 each of the plurality of second pixel electrodes is electrically connected to a corresponding one of the plurality of second thin film transistors and a corresponding one of the plurality of third thin film transistors,
 each of a plurality of second pixels are defined by a driving area of a corresponding one of plurality of second pixel electrodes in the second display panel, and
 one second thin film transistor of the plurality of second thin film transistors and one third thin film transistor of the plurality of third thin film transistors are electrically connected to a same second source line and a same second gate line.

6. The liquid crystal display device according to claim 5, wherein
 the plurality of first pixels includes a plurality of first color pixels corresponding to a first color, a plurality of second color pixels corresponding to a second color different from the first color, and a plurality of third color pixels corresponding to a third color different from the first color and the second color, and a first pixel group that includes one first color pixel of the plurality of first color pixels, one second color pixel of the plurality of second color pixels and one third color pixel of the plurality of third color pixels overlaps with the second pixel in planar view.

* * * * *